United States Patent
Kobayashi et al.

(10) Patent No.: US 7,634,620 B2
(45) Date of Patent: Dec. 15, 2009

(54) UTILIZATION OF STORAGE DEVICE FROM EXTERNAL TERMINAL IN NETWORK SYSTEM

(75) Inventors: Ikuko Kobayashi, Kawasaki (JP); Shinji Kimura, Sagamihara (JP); Hirofumi Inomata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 907 days.

(21) Appl. No.: 11/004,193

(22) Filed: Dec. 3, 2004

(65) Prior Publication Data
US 2006/0075196 A1  Apr. 6, 2006

(51) Int. Cl.
G06F 13/28  (2006.01)
G06F 15/177  (2006.01)

(52) U.S. Cl. .................. 711/147; 709/222
(58) Field of Classification Search .......... 709/222; 711/147
See application file for complete search history.

(56) References Cited

U.S. PATENT DOCUMENTS

| 7,162,509 B2 * | 1/2007 | Brown et al. | 709/201 |
| 7,356,677 B1 * | 4/2008 | Rafizadeh | 713/1 |
| 2004/0024870 A1 | 2/2004 | Hirata et al. | |
| 2004/0088367 A1 * | 5/2004 | Reinke | 709/215 |
| 2005/0193189 A1 * | 9/2005 | Kim | 713/1 |
| 2006/0015931 A1 * | 1/2006 | Davis et al. | 726/6 |
| 2006/0106585 A1 * | 5/2006 | Brown et al. | 703/1 |

* cited by examiner

*Primary Examiner*—Thu Ha T Nguyen
*Assistant Examiner*—Tariq S Najee-Ullah
(74) *Attorney, Agent, or Firm*—Townsend and Townsend and Crew LLP

(57) ABSTRACT

To provide a technique whereby a user can carry out operations in the same operating environment, regardless of whether the user uses a computer inside a network system, or uses a terminal outside the network system. A network system comprises: a first computer used by a designated user; and a plurality of second computers capable of being shared by a plurality of users. A management device, if a storage device is utilized by the first computer, allows the first computer to connect to a designated storage area and execute the boot-up program stored therein. The management device, if the storage device is utilized by an external terminal used by the designated user, allows one designated computer selected from the plurality of second computers to connect to the designated storage area and execute the boot-up program, and allows the external terminal to connect to the designated computer.

2 Claims, 21 Drawing Sheets

BOOT MANAGEMENT SERVER 310(210)

PORTAL SERVER 350

AUTHENTICATION SERVER 360

Fig.9

DISK RESOURCE MANAGEMENT TABLE (TB1)

| DISK IDENTIFYING INFORMATION | ALLOCATION INFORMATION |
|---|---|
| TARGET NAME (X)<br>IP ADDRESS (x.x.x.x)<br>INITIATOR NAME (Y) | ALLOCATED |
| TARGET NAME (X)<br>IP ADDRESS (x.x.x.x)<br>INITIATOR NAME ( ) | UNALLOCATED |
| | |

Fig.10

PC RESOURCE MANAGEMENT TABLE (TB2)

| PC TYPE INFORMATION (PERSONAL/SHARED) | PC GROUP INFORMATION (MODEL/HAL) | PC IDENTIFYING INFORMATION | USAGE INFORMATION (USED/UNUSED) |
|---|---|---|---|
| PERSONAL | Type Y | MAC ADDRESS (yyy) | — |
| SHARED | Type Y | MAC ADDRESS (zzz) | USED |
| PERSONAL | Type A | MAC ADDRESS (aaa) | — |
| SHARED | Type A | MAC ADDRESS (bbb) | UNUSED |
| | | | |

Fig.11

USER DISK MANAGEMENT TABLE (TB3)

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRY) | TARGET NAME (X) | MAC ADDRESS (yyy) | PC GROUP (Type Y) | PC TYPE (SHARED) |
| | IP ADDRESS (x.x.x.x) | | MAC ADDRESS (zzz) | MAC ADDRESS (zzz) |
| | | | | IP ADDRESS (z.z.z.z) |
| | INITIATOR NAME (Y) | | | OPERATING STATUS (BOOTED) |
| USER ID (USRA) | TARGET NAME (X) | MAC ADDRESS (aaa) | PC GROUP () | PC TYPE (PERSONAL) |
| | IP ADDRESS (x.x.x.x) | | | MAC ADDRESS (aaa) |
| | | | MAC ADDRESS () | IP ADDRESS () |
| | INITIATOR NAME (A) | | | OPERATING STATUS (SHUT DOWN) |

DA

Fig.16(A)
PRIOR TO PROCESS OF S210
(SELECTION OF SHARED-PC TO BE BOOTED UP) — TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP () | PC TYPE (PERSONAL) |
| | IP ADDRESS (x.x.x.x) | | MAC ADDRESS () | MAC ADDRESS (aaa) |
| | | | | IP ADDRESS () |
| | INITIATOR NAME(A) | | () | OPERATING STATUS (SHUT DOWN) |

Fig.16(B)
AFTER PROCESS OF S210
(SELECTION OF SHARED-PC TO BE BOOTED UP) — TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP () | PC TYPE (SHARED) |
| | IP ADDRESS (x.x.x.x) | | MAC ADDRESS () | MAC ADDRESS (bbb) |
| | | | | IP ADDRESS () |
| | INITIATOR NAME(A) | | () | OPERATING STATUS (SHUT DOWN) |

Fig.16(C)
AFTER PROCESS OF S230
(SELECTION OF DISK) — TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP () | PC TYPE (SHARED) |
| | IP ADDRESS (x.x.x.x) | | MAC ADDRESS () | MAC ADDRESS (bbb) |
| | | | | IP ADDRESS (b.b.b.b) |
| | INITIATOR NAME(A) | | () | OPERATING STATUS (SHUT DOWN) |

Fig.16(D)
AFTER PROCESS OF S250
(BOOT-UP FINISHING PROCESS FOR SHARED-PC) — TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP () | PC TYPE (SHARED) |
| | IP ADDRESS (x.x.x.x) | | MAC ADDRESS () | MAC ADDRESS (bbb) |
| | | | | IP ADDRESS (b.b.b.b) |
| | INITIATOR NAME(A) | | () | OPERATING STATUS (BOOTED) |

Fig.21(A)
PRIOR TO PROCESS OF S310
(SELECTION OF SHARED-PC TO BE SHUT DOWN)    ⌐TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP ( ) | PC TYPE (SHARED) |
| | IP ADDRESS (x.x.x.x) | | MAC ADDRESS ( ) | MAC ADDRESS (bbb) |
| | | | | IP ADDRESS (b.b.b.b) |
| | INITIATOR NAME(A) | | | OPERATING STATUS (BOOTED) |

Fig.21(B)
AFTER PROCESS OF S330
(SHUTDOWN FINISHING PROCESS FOR SHARED-PC)    ⌐TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP (Type A) | PC TYPE (PERSONAL) |
| | IP ADDRESS (x.x.x.x) | | MAC ADDRESS (bbb) | MAC ADDRESS (aaa) |
| | | | | IP ADDRESS ( ) |
| | INITIATOR NAME(A) | | | OPERATING STATUS (SHUT DOWN) |

Fig.22

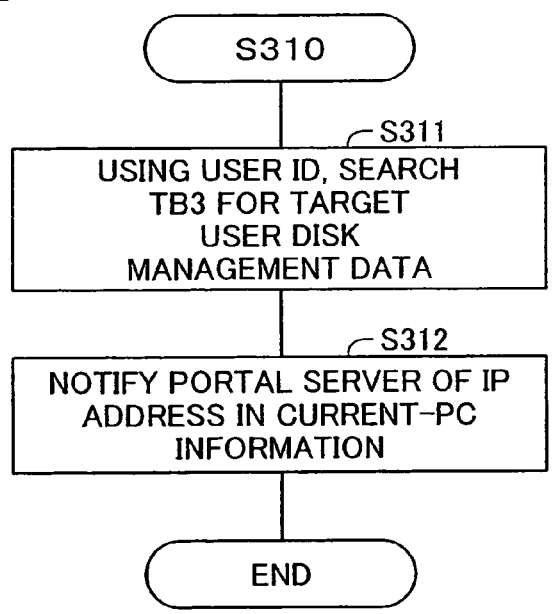

Fig.25(A)
PRIOR TO PROCESS OF S430
(SELECTION OF DISK)                          TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP (Type A) | PC TYPE (PERSONAL) |
| | IP ADDRESS (x.x.x.x) | | | MAC ADDRESS (aaa) |
| | | | MAC ADDRESS (bbb) | IP ADDRESS () |
| | INITIATOR NAME(A) | | | OPERATING STATUS (SHUT DOWN) |

DA

Fig.25(B)
AFTER PROCESS OF S430
(SELECTION OF DISK)                          TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP (Type A) | PC TYPE (PERSONAL) |
| | IP ADDRESS (x.x.x.x) | | | MAC ADDRESS (aaa) |
| | | | MAC ADDRESS (bbb) | IP ADDRESS (a.a.a.a) |
| | INITIATOR NAME(A) | | | OPERATING STATUS (SHUT DOWN) |

DA

Fig.25(C)
AFTER PROCESS OF S450
(BOOT-UP FINISHING PROCESS FOR PERSONAL-PC)   TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP (Type A) | PC TYPE (PERSONAL) |
| | IP ADDRESS (x.x.x.x) | | | MAC ADDRESS (aaa) |
| | | | MAC ADDRESS (bbb) | IP ADDRESS (a.a.a.a) |
| | INITIATOR NAME(A) | | | OPERATING STATUS (BOOTED) |

DA

Fig.27(A)
PRIOR TO PROCESS OF S530
(SHUTDOWN FINISHING PROCESS FOR PERSONAL-PC)  ⌐TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP (Type A) | PC TYPE (PERSONAL) |
| | IP ADDRESS (x.x.x.x) | | | MAC ADDRESS (aaa) |
| | | | MAC ADDRESS (bbb) | IP ADDRESS (a.a.a.a) |
| | INITIATOR NAME(A) | | | OPERATING STATUS (SHUT DOWN) |

DA {

Fig.27(B)
AFTER PROCESS OF S530
(SHUTDOWN FINISHING PROCESS FOR PERSONAL-PC)  ⌐TB3

| USER IDENTIFYING INFORMATION | DISK IDENTIFYING INFORMATION | PERSONAL-PC INFORMATION | SHARED-PC INFORMATION | CURRENT-PC INFORMATION |
|---|---|---|---|---|
| USER ID (USRA) | TARGET NAME (X) | MAC ADDRESS (aaa) | PC GROUP (Type A) | PC TYPE (PERSONAL) |
| | IP ADDRESS (x.x.x.x) | | | MAC ADDRESS (aaa) |
| | | | MAC ADDRESS (bbb) | IP ADDRESS () |
| | INITIATOR NAME(A) | | | OPERATING STATUS (SHUT DOWN) |

DA {

UTILIZATION OF STORAGE DEVICE FROM EXTERNAL TERMINAL IN NETWORK SYSTEM

CROSS REFERENCE

The present application is based on, and claims priority from, Japanese Application No. 2004-293215 filed Oct. 6, 2004, the disclosures of which are herein incorporated by reference.

BACKGROUND

The present invention relates to network system technology.

A typical intranet has external connectivity to the Internet. Using a terminal connected to the Internet, an intranet user can access data stored on a storage device on the intranet.

In the technology to date, while it is possible for the user to access is data stored on the storage device from outside the intranet as described above, it was difficult for the user to work in the same operating environment as that when the user utilizes a computer connected to the intranet.

SUMMARY OF THE INVENTION

In view of this drawback of the prior art, it is an object of the invention to provide a technique whereby a user can carry out operations in the same operating environment, regardless of whether the user uses a computer inside a network system, or uses a terminal outside the network system.

At least part of the above and the other related objects is attained by a system of the present invention. The system is a network system permitting access from an external terminal. The system comprises: a first computer used by a designated user; a plurality of second computers capable of being shared by a plurality of users; and a storage device connectable with the first computer and the plurality of second computers. The storage device contains a plurality of storage areas wherein one of the plurality of storage areas is a designated storage area allotted for use by the designated user. The designated storage area has stored therein a boot-up program for booting up the first computer or the second computer used by the designated user, to a state in which the designated user can utilize the first computer or the second computer. The system further comprises a management device that manages connections between the first computer and the plurality of second computers, and the storage device. The management device, if the storage device is utilized by the first computer, allows the first computer to connect to the designated storage area and execute the boot-up program; and if the storage device is utilized by the external terminal used by the designated user, allows one designated computer selected from the plurality of second computers to connect to the designated storage area and execute the boot-up program, and allows the external terminal to connect to the designated computer.

In the above system, both the first computer and the designated computer can connect to the same storage area, and execute the same boot-up program, whereby the designated user can carry out operations in the same operating environment, regardless of whether the designated user uses the first computer inside the network system, or uses the external terminal outside the network system.

Herein, "the same operating environment" means a condition in which the same disk image is used, the "disk image" including an operating system and other programs, and data.

In the above system, it is preferable that the management device comprises a computer selecting section for selecting the designated computer from among the plurality of second computers. The computer selecting section may comprise a first table having stored therein information indicating a second computer of a first class allocated to the designated user in the past. The computer selecting section may refer to the first table and select as the designated computer the second computer of the first class.

By employing this arrangement, one of the plurality of second computers can be readily selected as the designated computer.

In the above system, it is preferable that the management device comprises a computer selecting section for selecting the designated computer from among the plurality of second computers. The computer selecting section may comprise a second table having stored therein information relating to hardware configuration of the first computer, and information relating to hardware configuration of the plurality of second computers. The computer selecting section may refer to the second table and selects as the designated computer a second computer of a second class having the same hardware configuration as the first computer.

By employing this arrangement, the second computer capable of executing the boot-up program in the designated storage area can be readily selected as the designated computer, from among the plurality of second computers.

In the above system, the computer selecting section, if the second computer of the second class cannot be selected as the designated computer, may select as the designated computer a second computer of a third class having a virtual machine function.

Alternatively, in the above system, the computer selecting section, if the second class of the second computer cannot be selected as the designated computer, may select as the designated computer an arbitrary second computer of a fourth class, and may store prepared information needed for operation of the second computer of fourth class, in the designated storage area.

By employing this arrangement, if the second computer of the second class cannot be selected, another second computer can be selected as the designated computer.

In the above system, it is preferable that the management device comprises a storage area selecting section for selecting the designated storage area from among the plurality of storage areas. The storage area selecting section may select the designated storage area on the basis of information provided by the first computer or the designated computer, and supply information indicating the designated storage area to the first computer or the designated computer.

In the above system, the management device may comprise a third table containing identifying information for identifying the first computer or the designated computer that connects to the designated storage area. The management device may update the identifying information in the third table, each time connection status between the designated storage area and the first computer or the designated computer is changed.

By employing this arrangement, the network system manager, by referring to the third table, can readily ascertain which computer is connected to the designated storage area.

In the above system, it is preferable that the designated computer receives from the external terminal input data input at the external terminal, and sends to the external terminal image data processed according to the input data.

By employing this arrangement, even if the external terminal and the network system are connected over a narrow-band line such as the Internet, communication speed sufficiently fast for operation can be reached between the external terminal and the network system.

It is preferable that the system comprises: a first subnet including the first computer; and a second subnet including the plurality of second computers. The management device may cause the external terminal to connect to the designated computer included in the second subnet, without connecting to the first subnet.

By employing this arrangement, since the external terminal does not connect to the second subnet, security of the network system can be improved.

In the above system, it is preferable that the management device comprises an authentication section that, if the storage device is utilized by the external terminal, performs authentication of a user using the external terminal. The authentication section, if it is authenticated that the external terminal is used by the designated user, may supply to the external terminal an address for connecting to the designated computer.

It should be noted that the present invention may be actualized by a diversity of applications such as a network system, a method and a device for managing network system, computer programs that attain these methods or functions of these devices, recording media in which such computer programs are recorded, and data signals that include such computer programs and are embodied in carrier waves.

These and other objects, features, aspects, and advantages of the present invention will become more apparent from the following detailed description of the preferred embodiments with the accompanying drawings.

BRIEF DESCRIPTION OF THE DRAWINGS

FIG. 9 is an illustration showing a disk resource management table TB1;

FIG. 10 is an illustration showing a PC resource management table TB2;

FIG. 11 is an illustration showing a user disk management table TB3;

FIGS. 16(A)-16(D) are illustrations showing user disk management to data DA relating to designated user, included in the user disk management table TB3;

FIGS. 21(A) and 21(B) are illustrations showing user disk management data DA relating to designated user included the user disk management table TB3;

FIG. 22 is a flowchart showing the particular process description of Step S310 (FIG. 20);

FIGS. 25(A)-25(C) are illustrations showing user disk management data DA relating to designated user included in the user disk management table TB3;

FIGS. 27(A) and 27(B) are illustrations showing user disk management data DA relating to designated user included in the user disk management table TB3.

DESCRIPTION OF THE PREFERRED EMBODIMENT

Figure 1:
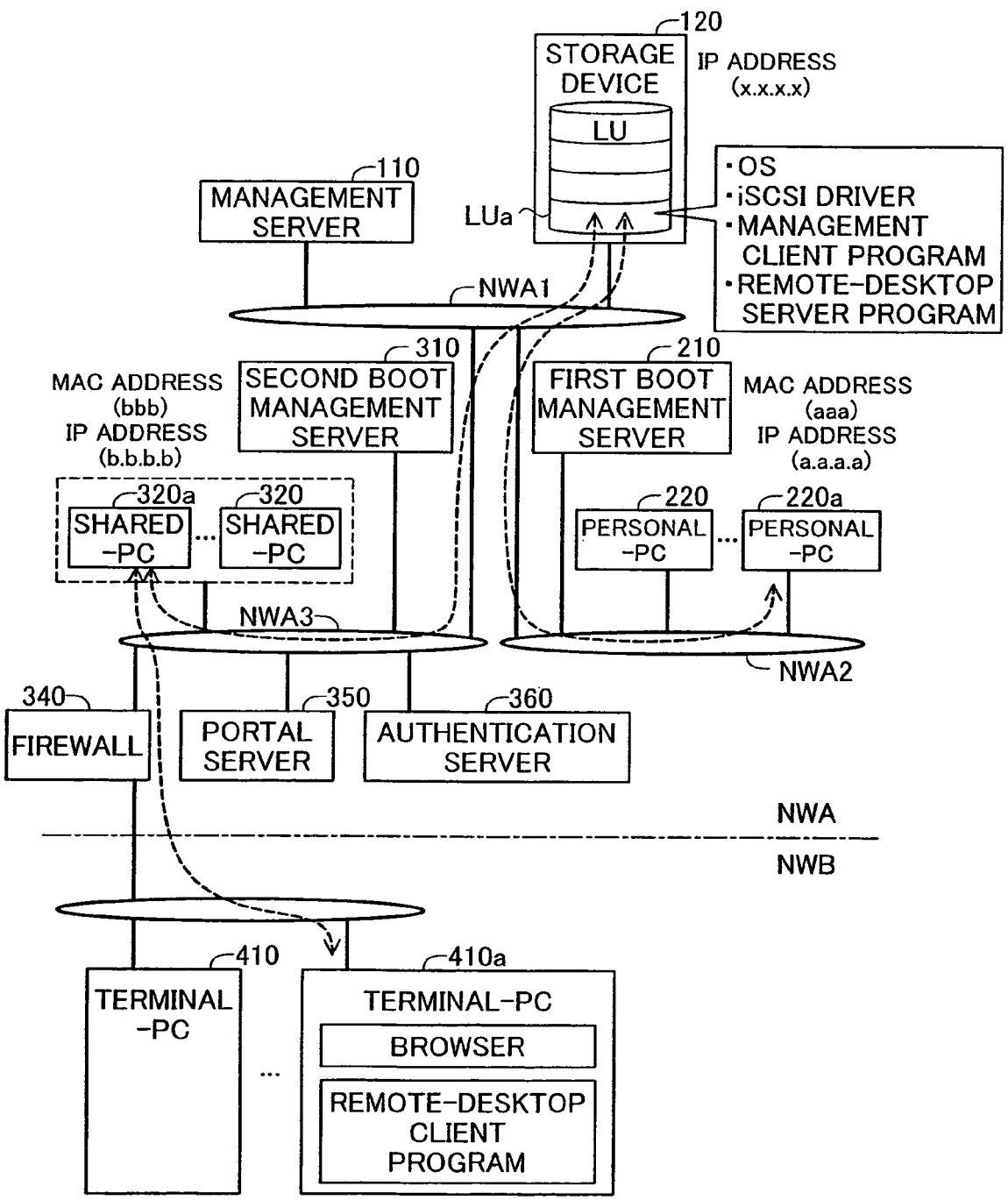
FIG. 1 is an illustration showing a simplified arrangement of a network system.

Embodiments of the present invention are discussed below based on examples in the following order.
A. Network System Arrangement
 A-1. Arrangement of Components
 A-2. Management Tables
 A-3. User Disk Allocation Process
B. Utilization of Designated Disk by Terminal-PC
 B-1. Shared-PC Boot Process
 B-2. Process Description of Steps S210, S230, S250
 B-3. Shared-PC Shutdown Process
 B-4. Process Description of Steps S310, S330
C. Utilization of Designated Disk by Personal-PC
 C-1. Personal-PC Boot Process
 C-2. Process Description of Steps S430, S450
 C-3. Personal-PC Shutdown Process
 C-4. Process Description of Step S530
A. Network System Arrangement:

FIG. 1 is an illustration showing a simplified arrangement of a network system. The network system includes three subnets NWA1-NWA3 that constitute an intranet NWA. The first subnet NWA1 is connected to the second subnet NWA2 and to the third subnet NWA3. To the first subnet NWA1 are connected a management server 110 and a storage device 120. To the second subnet NWA2 are connected a first boot management server 210 and a plurality of dedicated computers (hereinafter "personal-PCs") 220. To the third subnet NWA3 are connected a second boot management server 210, a plurality of shared computers (hereinafter "shared-PCs") 320, a firewall 340, a portal server 350, and an authentication server 360.

The network system is connected externally to the Internet via the is firewall 340. In FIG. 1, a plurality of external terminals (hereinafter "terminal-PCs") 410 are connected to the Internet NWB.

The storage device 120 contains a plurality of logical units (storage areas) LU. The plurality of logical units are allocated to a plurality of users. Each user can utilize his or her allocated logical unit, using a personal-PC or shared-PC. Each of the personal-PCs 220 is a computer used by a predetermined user; each of the shared-PCs 320 is a computer that can be shared by a plurality of users. A designated personal-PC 220*a* for use by a designated user is able to access a designated logical unit LUa allocated to the designated user. A terminal-PC 410*a* used by the designated user is able to access the designated logical unit LUa via a selected designated shared-PC 320. By means of this arrangement, in the network system of this embodiment, when a designated user utilizes the terminal-PC 410*a*, there is provided the same operating environment as that when the designated personal-PC 220*a* is used.

The management server 110, the two boot management servers 210, 310, the portal server 350, and the authentication server 360 in this embodiment correspond to the "management device" of the present invention; the portal server 350 and the authentication server 360 correspond to the "authentication section". Herein, "logical units" are also called "disks".

Figure 2:
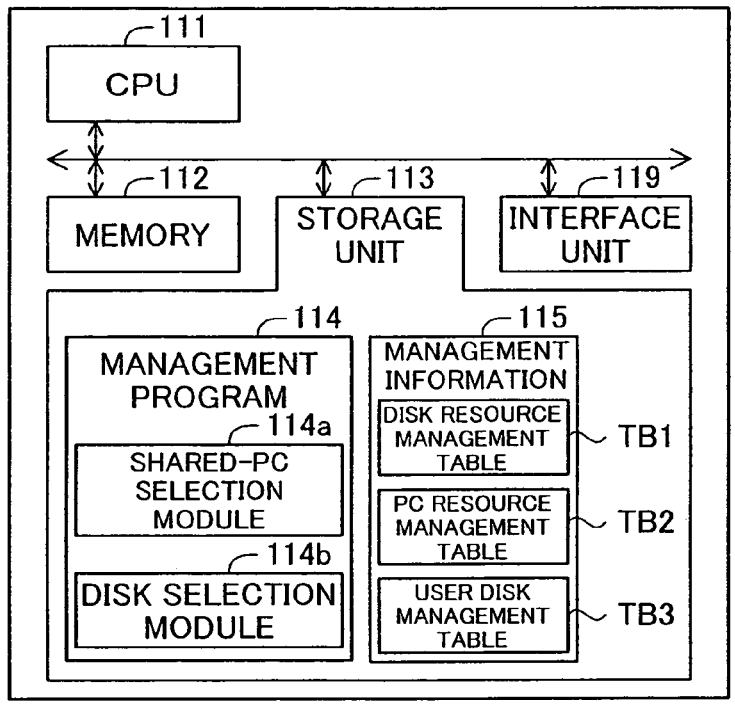
FIG. 2 is an illustration showing a simplified arrangement of a management server 110.

A-1. Arrangement of Components:

A-1-1. Management Server 110:

FIG. 2 is an illustration showing a simplified arrangement of the management server 110. The management server 110 comprises a CPU 111, a memory such as ROM and RAM, a storage unit 113 such as a hard disk, and an interface unit 119 for connecting to the network. An management program 114 and management information 115 are stored in the storage unit 113. The management program 114 includes a shared-PC selection module 114*a* for selecting one of the plurality of shared-PCs, and a disk selection module 114*b* for selecting one of the plurality of logical units. The management program may be provided in a form recorded on a computer-readable medium such as CD-ROM.

By executing the management program 114, the management server 110 manages connections between the personal-PCs or shared-PCs and the storage device 120. Management of connections is carried out with reference to the management information 115. As will be described later, the management information 115 includes a disk resource management table TB1, a PC resource management table TB2, and a user disk management table TB3.

A-1-2. Storage Device 120:

The storage device 120 is a storage device for iSCSI. The storage device 120 can be accessed from the personal-PCs or shared-PCs according to the iSCSI protocol. "iSCSI" is a standard for transferring SCSI commands/data via IP networks.

Figure 3:
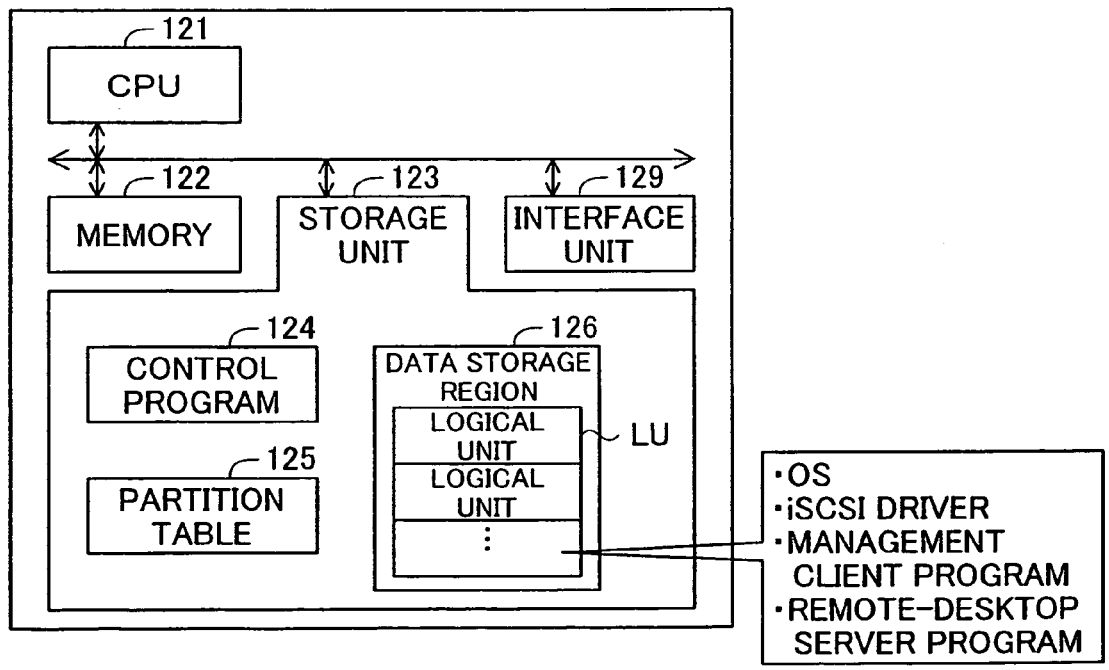
FIG. 3 is an illustration showing a simplified arrangement of a storage device 120.

FIG. 3 is an illustration showing a simplified arrangement of the storage device 120. The storage device 120 comprises a CPU 121, a memory 122, a storage unit 123, and an interface unit 129. The storage unit 123 includes one or more hard disks. A portion of the area of the storage unit stores a control program 124 and a partition table 125. The other area is utilized as a data storage region 126. The data storage region 126 is partitioned into a plurality of logical units (storage areas) LU. Each logical unit LU may be a storage area composed of one or more hard disks, or a storage area composed of part of one hard disk. The size (capacity) of each of the logical units may be the same, or different. Using a management console (not shown), a manager partitions the data storage region 126 into the plurality of logical units, and creates the partition table 125. In the partition table 125 are registered the size of each of the logical units, and information identifying each of the logical units (specifically, its iSCSI initiator name, described later). Also stored in the logical units are the OS, an iSCSI driver, a management client program, and a remote-desktop server program.

The storage device 120, by executing the control program 124, controls access to the logical units LU by the personal-PCs or shared-PCs. Specifically, the control program extracts SCSI commands/data in IP packets supplied from a personal-PC or a shared-PC, and executes data write/read operations for the logical units. The control program also embeds SCSI data in IP packets, and sends these to a personal-PC or a shared-PC.

Figure 4:
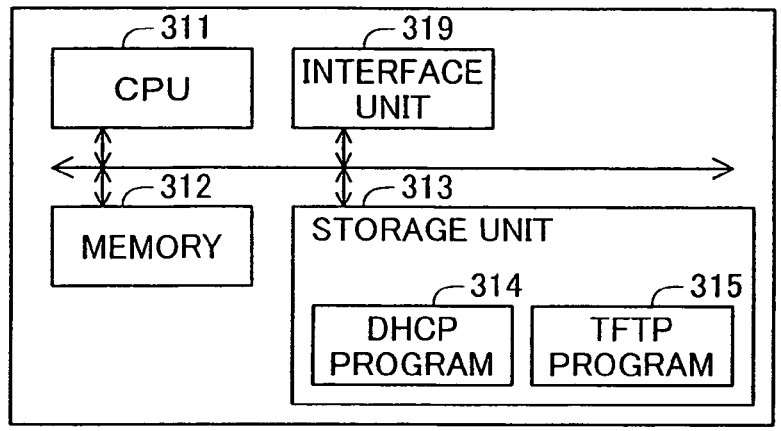
FIG. 4 is an illustration showing a simplified arrangement of the second boot management server 310.

A-1-3. Boot Management Server 310 (210):

FIG. 4 is an illustration showing a simplified arrangement of the second boot management server 310. The second boot management server 310 comprises a CPU 311, a memory 312, a storage unit 313, and an interface unit 319. The storage unit 313 stores a DHCP (Dynamic Host Configuration Protocol) program 314, and TFTP (Trivial File Transfer Protocol) program 315. The DHCP program has the function of allocating IP address automatically to computers on the network. The TFTP program has the function of realizing file transfer protocol not requiring authentication of user ID and password. The second boot management server, by executing the DHCP program and the TFTP program, functions as a DHCP server and a TFTP server, providing to shared-PCs a bootstrap program needed for booting the computer.

The first boot management server 210 is similar to the second boot management server 310. However, the first boot management server 310 provides the bootstrap program to personal-PCs.

Figure 5:
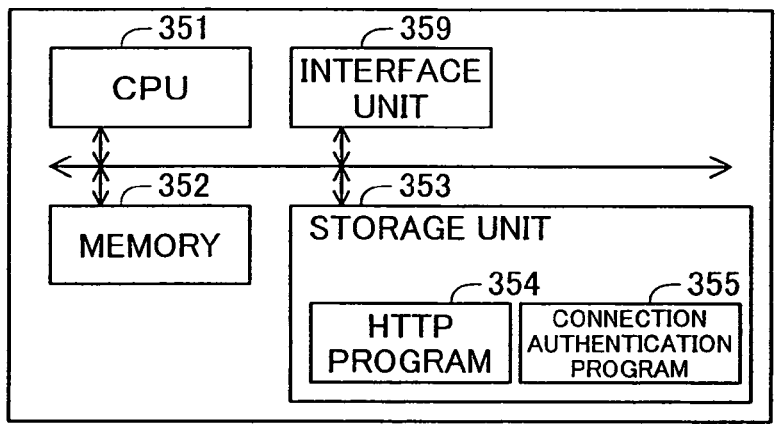
FIG. 5 is an illustration showing a simplified arrangement of the portal server 350.

A-1-4. Portal Server 350:

FIG. 5 is an illustration showing a simplified arrangement of the portal server 350. The portal server 350 comprises a CPU 351, a memory 352, a storage unit 353, and an interface unit 359. The storage unit 353 stores an HTTP (HyperText Transfer Protocol) program 354, and a connection authentication program 355. By executing the HTTP program and the connection authentication program, the portal server 350 authenticates connections of the terminal-PCs 410 to the network system. Specifically, the HTTP program sends pages described in HTML to the terminal-PCs 410. The connection authentication program transmits to the authentication server 360 user information (user ID and password) for user authentication, which is supplied from a terminal-PC 410 via an HTML page screen. If a user is authenticated by the authentication server 360, the connection authentication program then authenticates connection of the terminal-PC to the network system.

Figure 6:
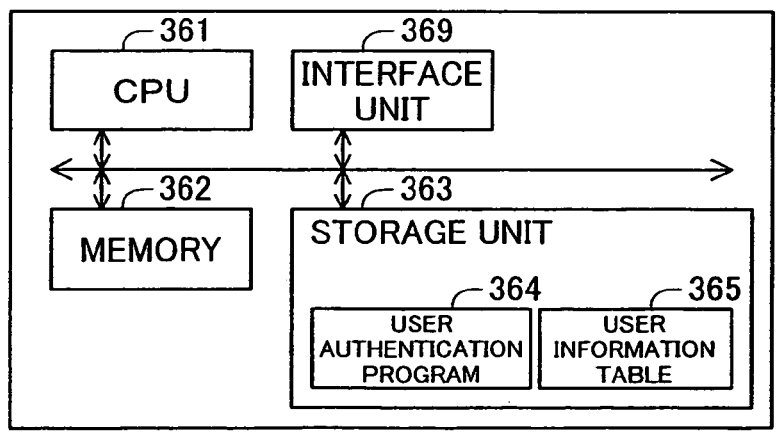
FIG. 6 is an illustration showing a simplified arrangement of the authentication server 360.

A-1-5. Authentication Server 360:

FIG. 6 is an illustration showing a simplified arrangement of the authentication server 360. The authentication server 360 comprises a CPU 361, a memory 362, a storage unit 363, and an interface unit 369. The storage unit 363 stores a user authentication program 364 and a user information table 365. User IDs and passwords for a plurality of users are registered in the user information table. It should be noted that the user information table is created in advance by the manager, using the management console (not shown). By executing the authentication program, the authentication server authenticates a user using a terminal-PC 410. Specifically, the user authentication program authenticates the user in cases where the user information provided by the portal server 350 matches the information registered in the user information table.

Figure 7:
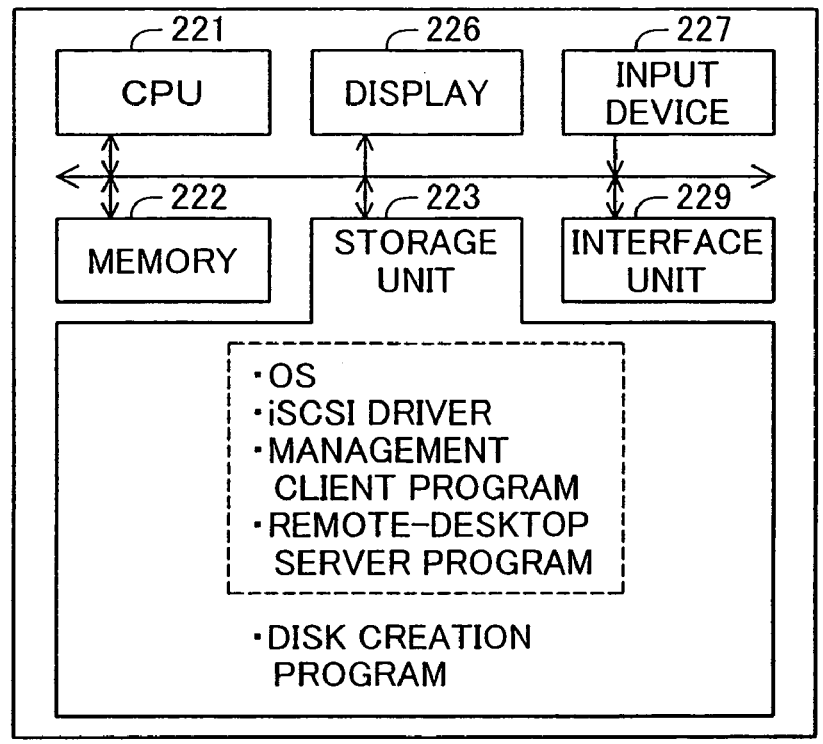
FIG. 7 is an illustration showing a simplified arrangement of a personal-PC 220.

A-1-6. Personal-PC 220:

FIG. 7 is an illustration showing a simplified arrangement of the personal-PC 220. The personal-PC 220 comprises a CPU 221, a memory 222, a storage unit 223, a display 226, an input device 227 such as a mouse and keyboard, and an interface unit 229. The storage unit 223 stores an OS, an iSCSI driver, a management client program, a remote-desktop server program, and a disk creation program. These programs are copied to the logical unit LU in the storage device 120, which has been allocated to the user of the personal-PC.

Figure 8:
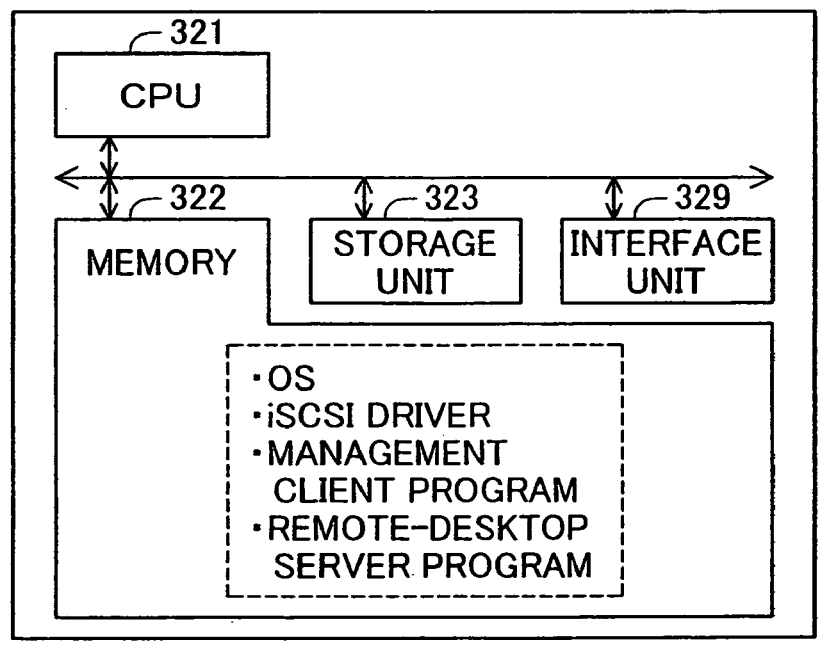
FIG. 8 is an illustration showing a simplified arrangement of a shared-PC 320.

A-1-7. Shared-PC 320:

FIG. 8 is an illustration showing a simplified arrangement of the shared-PC 320. The shared-PC 320 comprises a CPU 321, a memory 322, a storage unit 323, and an interface unit 329. The shared-PC is a "blade" type computer. The memory 322 stores the OS, iSCSI driver, management client program, and remote-desktop server program downloaded from the logical unit LU. It should be noted that the shared-PC 320 need not be equipped with the storage unit 323.

A-1-8. Terminal-PC 410:

The terminal-PC 410 comprises a CPU, a memory, and a storage unit. A browser and a remote-desktop client program are stored in the storage unit. By executing these programs, the terminal-PC accesses the storage device 120 via a shared-PC. The remote-desktop client program has the function of communicating with a shared-PC functioning as a remote-desktop server. The remote-desktop client program is also referred to as an RDP (Remote Desktop Protocol) client program.

In the description hereinbelow, it is assumed that, as shown in FIG. 1, the designated personal-PC 220*a* used by a designated user has a MAC address of "aaa" and an IP address of "a.a.a.a", and the designated shared-PC 320*a* has a MAC address of "bbb" and an IP address of "b.b.b.b". Let it also be assumed that the storage device 120 has an IP address of "x.x.x.x".

A-2. Management Tables:

As noted, the management server 110 has three management tables TB1-TB3.

FIG. 9 is an illustration showing the disk resource management table TB1. In the table TB1, disk resource management data is registered on a per-disk (logical unit) LU basis. The disk resource management data contains disk identifying information and allocation information. The disk identifying information includes an iSCSI target name, an IP address, and an iSCSI initiator name. The iSCSI target name and IP address are information for designating a target, i.e. the storage device 120. The iSCSI initiator name is information for designating a host (initiator) permitted to access a logical unit LU in the storage device 120. That is, as shown in FIG. 9, in this embodiment, the same iSCSI target name "X" and the same IP address "x.x.x.x" are set for each logical unit LU, but iSCSI initiator names different from one another are set. The allocation information indicates whether a logical unit has been allocated to a designated host (initiator). It should be noted that a host (initiator) corresponds directly to an iSCSI driver that executes the connection to a logical unit, and corresponds indirectly to a user.

The disk resource management data is created in advance by the network system manager, using the management console (not shown). However, the disk resource management data as-created does not have iSCSI initiator name registered, so the allocation information is set to "unallocated".

FIG. 10 is an illustration showing the PC resource management table TB2. In the table TB2, PC resource management data is registered on a per-PC basis for PCs connected to the second and third subnets NWA2, 3. The PC resource management data contains PC type information, PC group information, PC identifying information, and usage information. The PC type information indicates whether a PC is a shared-PC or personal-PC. The PC group information indicates PC classification, specifically, the PC's model, HAL (Hardware Abstraction Layer), and so on. Note that HAL is a module for compensating for differences in hardware configurations. The PC identifying information indicates the unique MAC address of the PC. Usage information is set only for shared-PCs, and indicates whether a shared-PC is currently in use.

The PC resource management data is created in advance by the network system manager, using the management console (not shown). However, the usage status in the PC resource management data may be updated as appropriate.

FIG. 11 is an illustration showing the user disk management table TB3. In the table TB3, user disk management data is registered on a per-user basis. The user disk management data includes user identifying information, disk identifying information, personal-PC information, shared-PC information, and current-PC information. The user identifying information indicates the user ID. The disk identifying information is similar to the disk identifying information of FIG. 9. The personal-PC information indicates PC identifying information (MAC address) relating to personal-PCs. The shared-PC information indicates PC group information and PC identifying information (MAC address) relating to shared-PCs. The PC group information for the shared-PCs is similar to the PC group information of FIG. 10. The current-PC information is information relating to current-PC (personal-PC or shared-PC) currently in use by user, and includes PC type information, PC identifying information (MAC address), IP address, and operating status for current-PCs. Operating status indicates whether a current-PC is in a booted state or a shut down state. A booted state means that the current-PC has been booted using the OS or other program in the logical unit LU.

As will be explained later, user disk management data is created when a disk (logical unit) is allocated to user by the network system manager.

Figure 12:
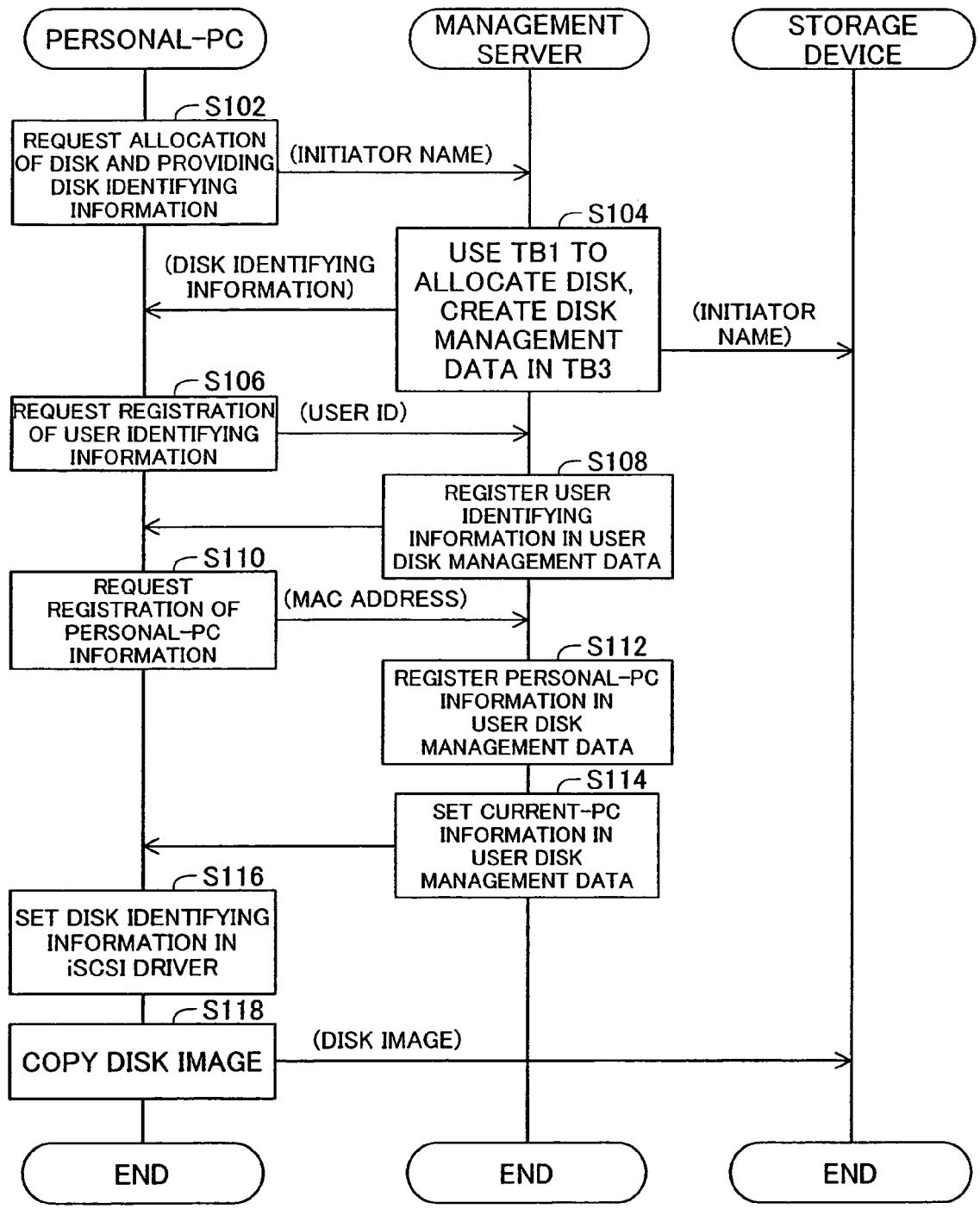
FIG. 12 is a flowchart showing the procedure of the process for allocating a disk to a user.

A-3. User Disk Allocation Process:

FIG. 12 is a flowchart showing the procedure of the process for allocating a disk to a user. As shown in FIG. 11, by means of this process, user disk management data DA is created for a designated user. When executing the process of FIG. 12, typically, the designated personal-PC 220*a* to be used by the designated user is operated by the network system manager. The processes of the designated personal-PC 220*a* are executed by a disk creation program, and the processes of the management server 110 are executed by a management program.

In Step S102, the designated personal-PC 220*a* requests the management server 110 to allocate a disk and to provide disk identifying information indicating the allocated disk. At this time, the iSCSI initiator name "A", which indicates the iSCSI driver of the designated personal-PC 220*a*, is sent.

In Step S104, the management server 110 allocates a disk to the designated personal-PC 220*a* (more specifically, the iSCSI driver). Specifically, the management server utilizes the allocation information of the disk resource management table TB1 (FIG. 9) to search for an "unallocated" disk, and allocates one disk to the designated personal-PC. At this time, the iSCSI initiator name "A" given from the designated personal-PC in Step S102 is appended to the disk identifying information in the disk resource management data corresponding to the allocated disk. The allocation information in the disk resource management data corresponding to the allocated disk is changed to "allocated".

Also, in Step S104, the management server 110 creates new user disk management data DA in the user disk management table TB3 (FIG. 11). At this time, the management server refers to the disk resource management table TB1 (FIG. 9), and sets in the created user disk management data disk identifying information that indicates the allocated disk (the disk identifying information includes iSCSI target name "X", IP address "x.x.x.x", iSCSI initiator name "A"). The management server also sends the disk identifying information to the designated personal-PC.

Further in Step S104, the management server 110 sends the iSCSI initiator name to the storage device 120. By so doing, the iSCSI initiator name for designating the allocated disk is registered in the partition table 125 of storage device 120.

In Step S106, the designated personal-PC 220a requests the management server 110 to register user identifying information (user ID).

In Step S108, the management server 110 registers the user identifying information (user ID "USRA") in the user disk management data DA (FIG. 11).

In Step S110, the designated personal-PC 220a requests the management server 110 to register personal-PC information (MAC address).

In Step S112, the management server 110 registers the personal-PC information (MAC address "aaa") in the user disk management data DA (FIG. 11).

In Step S114, the management server 110 sets information relating to the designated personal-PC, in the current-PC information of the user disk management data DA (FIG. 11). Specifically, the PC type in the current-PC information is set to "personal", the MAC address is set to "aaa", and the operating status is set to "shut down". Here, a "shut down" operating status means that the designated personal-PC has not been booted up using the designated disk.

In Step S116, the designated personal-PC 220a sets in the iSCSI driver the disk identifying information, which was sent from the management server 110 in Step S104. As a result, the iSCSI driver can connect to the allocated disk (designated disk) LUa in the storage device 120 designated by the disk identifying information.

In Step S118, the designated personal-PC 220a utilizes the iSCSI driver so as to connect to the designated disk LUa, and copies the disk image in the designated disk. Here, the disk image means programs, data and the like stored in the designated personal-PC. In this embodiment, copied programs include the OS, iSCSI driver, management client program, and remote-desktop server program.

At the time that the process of FIG. 12 has completed, the shared-PC information and the IP address included in the current-PC information have not been set in the user disk management data DA. The shared-PC information and the IP address are set in another process described later.

B. Utilization of Designated Disk by Terminal-PC:

As described above, access to the storage device 120 from a terminal-PC 140 is carried out via the shared-PC 320, and thus it is necessary to boot the shared-PC. Further, when access to the storage device from the terminal-PC is terminated, it is necessary to shut down the shared-PC. Following is a description of the boot-up process and shutdown process of the shared-PC.

Figure 13:
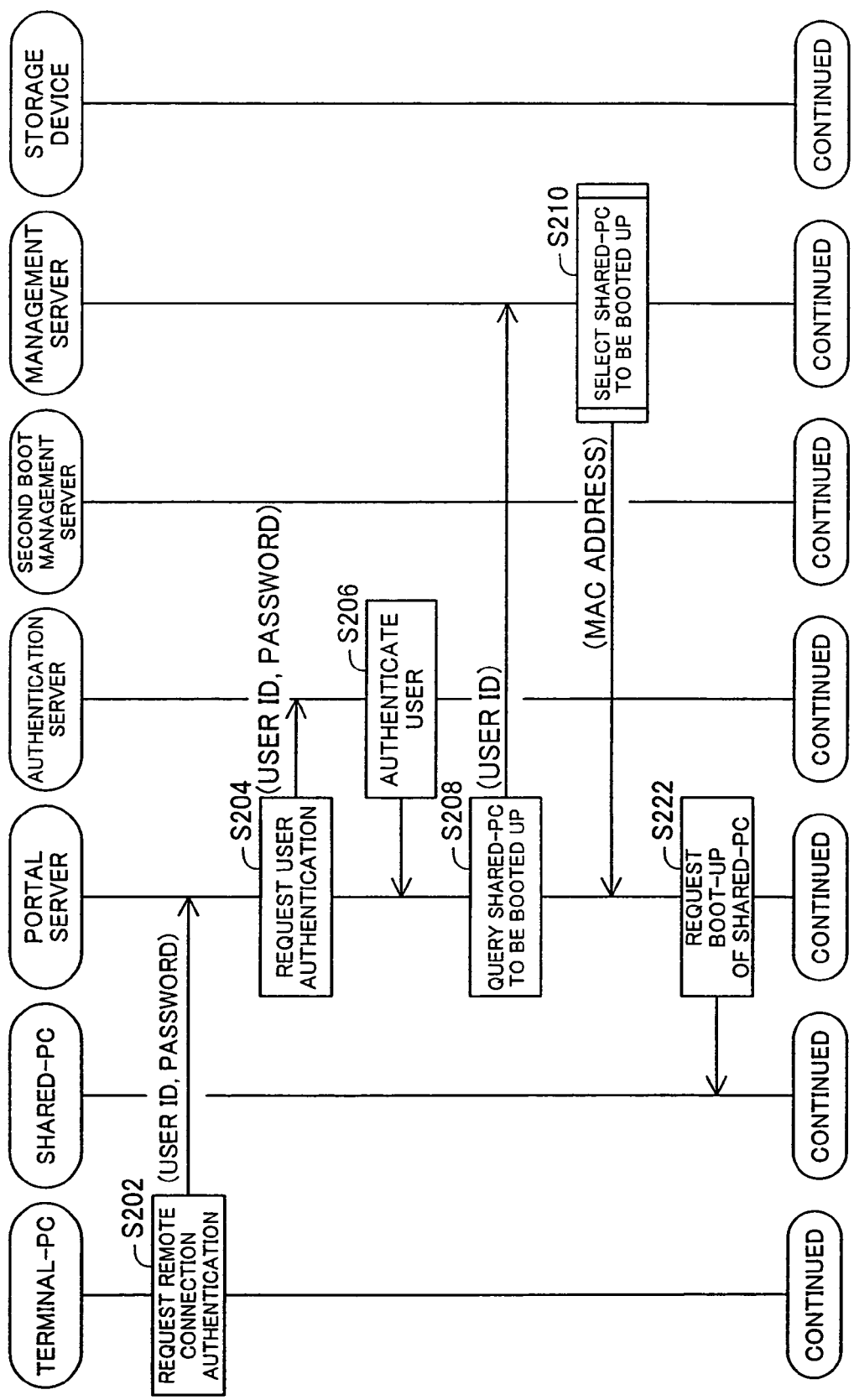
FIG. 13 is flowchart showing the boot process of a shared-PC.
Figure 14:
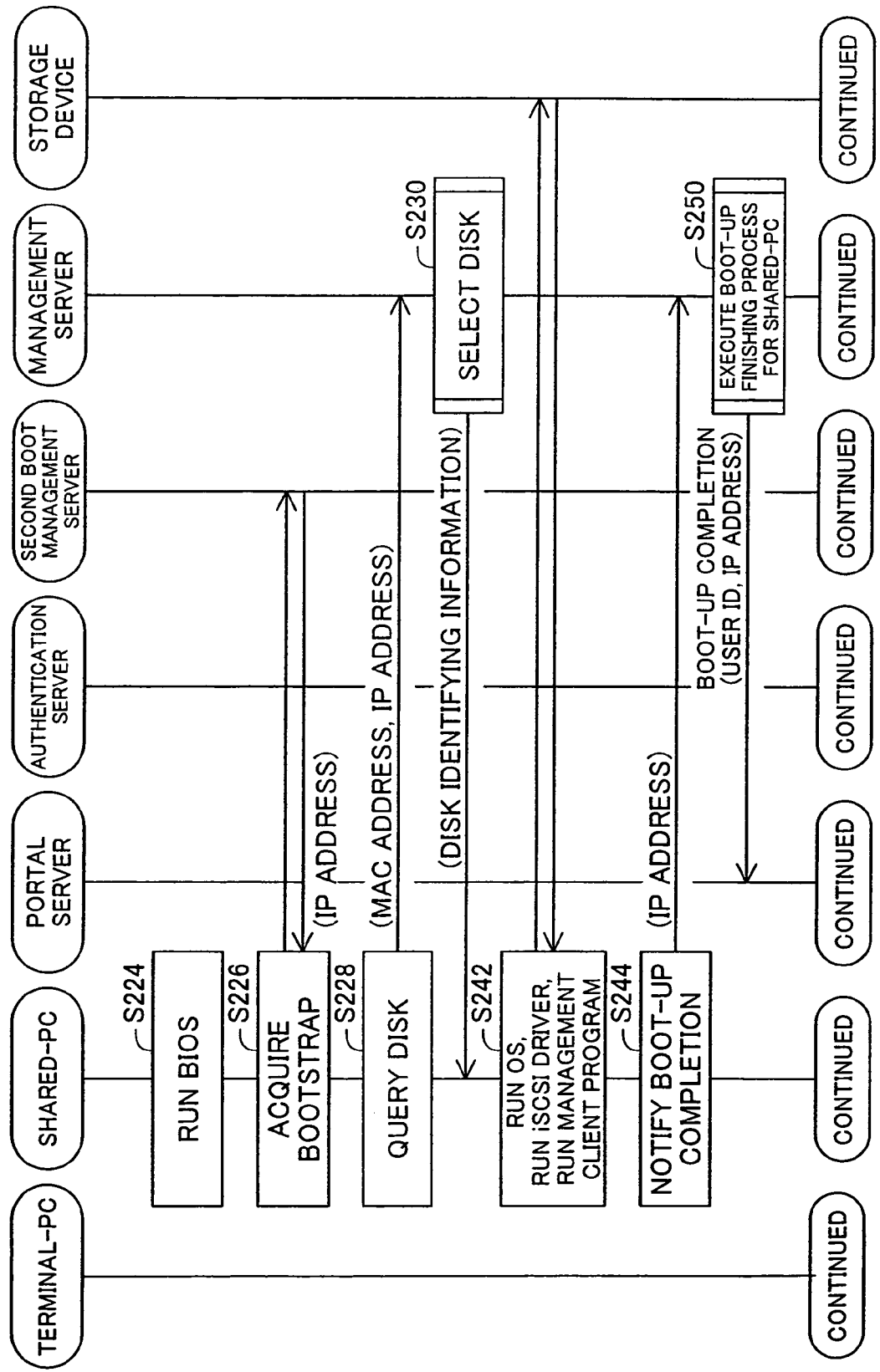
FIG. 14 is flowchart showing the boot process of a shared-PC.
Figure 15:
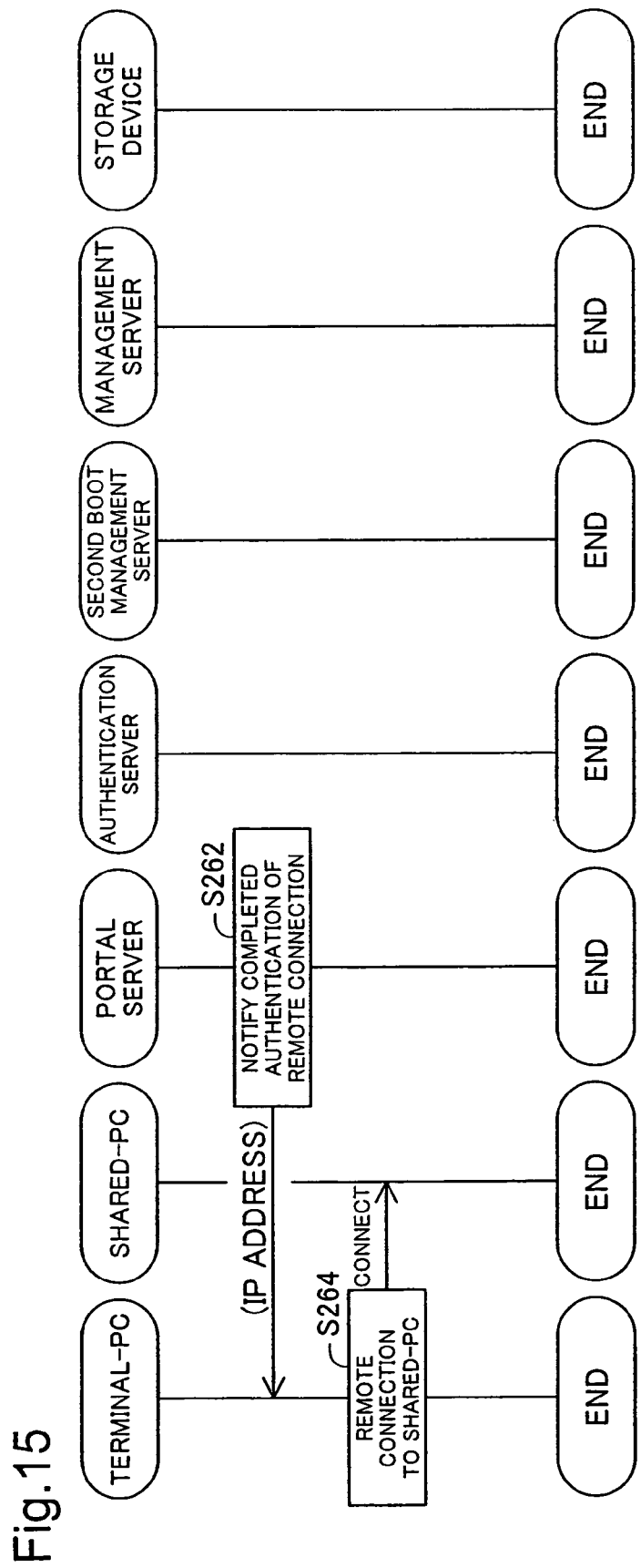
FIG. 15 is flowchart showing the boot process of a shared-PC.

B-1. Shared-PC Boot Process:

FIGS. 13, 14 and 15 are flowcharts showing the boot process of a shared-PC. FIGS. 13 through 15 show a series of processes.

In Step S202 (FIG. 13), a terminal-PC 404a requests the portal server 350 for authentication of a remote connection. Specifically, the designated user starts up the browser on the terminal-PC, and requests authentication of a remote connection via an HTML page screen provided by the portal server. At this time, user information including a user ID and password are sent. Transmission of user information may be carried out by the user inputting the user information using the keyboard of the terminal-PC, or carried out by the user inserting a memory card having the user information stored thereon, into the terminal-PC.

In Step S204, the portal server 350 requests the authentication server 360 to authenticate the user. At this time, the portal server sends to the authentication server the user information including the user ID and password provided by the terminal-PC 410a.

In Step S206, the authentication server 360 authenticates the user. Specifically, the authentication server refers to the user information table 365 (FIG. 6) and determines whether access is being requested by a registered user, and in the event that access is by a registered user, carries out authentication.

In Step S208, the portal server 350 queries the management server 110 regarding the shared-PC to be booted. At this time, the user ID is sent.

In Step S210, the management server 110 uses the provided user ID so as to select the shared-PC to be booted up. Selection of the shared-PC is carried out by the shared-PC selection module 114a (FIG. 2), during which time the management information 115 is used. The management server then sends the MAC address indicating the selected designated shared-PC to the portal server 350. The process of Step S210 will be described further hereinbelow.

In Step S222, the portal server 350 requests boot up of the designated shared-PC specified by the provided MAC address. Specifically, the portal server turns on the power of the designated shared-PC 320, via the sub-net NWA3.

In Step S224 (FIG. 14), the designated shared-PC 320a runs the BIOS.

In Step S226, the designated shared-PC 320a acquires a bootstrap program from the second boot management server 310. Specifically, the BIOS of the designated shared-PC runs a PXE (Pre-Boot Execution Environment) client program. The designated shared-PC functioning as a PXE client first requests the second boot management server 310 (FIG. 4), which functions as the DHCP server, to send the address of the TFTP server, and acquires the address of the TFTP server. Next, the designated shared-PC functioning as the PXE client requests the second boot management server functioning as the TFTP server to send the bootstrap program, and acquires the bootstrap program.

In Step S226, the designated shared-PC 320a functioning as the PXE client requests the second boot management server 310 functioning as the DHCP server to allocate an IP address, and acquires the IP address.

In Step S228, the designated shared-PC 320a queries the management server 110 regarding the disk to be accessed. At this time, the MAC address and IP address of the designated shared-PC are sent.

In Step S230, the management server 110 uses the provided MAC address so as to select the disk to be accessed by the designated shared-PC 320a. Selection of the disk is carried out by the disk selection module 114b (FIG. 2), during which time the management information 115 is used. The management server then sends disk identifying information indicating the selected designated disk LUa to the designated shared-PC. The process in Step S230 will be described further hereinbelow.

In Step S242, the designated shared-PC 320a utilizes the provided disk identifying information so as to execute the boot process. Specifically, the bootstrap program downloads the OS, iSCSI driver, and management client program from the designated disk LUa specified by the disk identifying information. The bootstrap program runs the OS and iSCSI driver sequentially, and the OS runs the management client program. In this way, the boot process of the designated shared-PC is completed.

In Step S244, the designated shared-PC 320a notifies the management server 110 of boot-up completion. At this time, an IP address of the designated shared-PC is sent by the management client program run in Step S242.

In Step S250, the management server 110 uses the provided IP address so as to execute a boot-up finishing process for the designated shared-PC 320a. This finishing process is carried out utilizing the management information 115. The management server then notifies the portal server 350 of boot-up completion of the designated shared-PC. At this time, the user ID and the IP address of the designated shared-PC are sent. The process in Step S250 will be described further hereinbelow.

In Step S262 (FIG. 15), the portal server 350 notifies the terminal-PC 410a that sent the user ID in Step S202 (FIG. 13), of completed authentication of the remote connection. At this time, the portal server sends to the terminal-PC the IP address of the designated shared-PC provided by the management server 110.

In Step S264, the terminal-PC 410a connects to the designated shared-PC 320a specified by the provided IP address. Specifically, the browser runs the remote-desktop client program. The remote-desktop client program then connects to the designated shared-PC specified by the provided IP address.

Transmission of data between a terminal-PC and a designated shared-PC is carried out in the following manner. The terminal-PC functions as a remote-desktop client, and sends to the shared-PC input data given from an input device, such as a keyboard or mouse, of the terminal-PC. The designated shared-PC functions as a remote-desktop server, and sends to the terminal-PC display data created on the basis of the input data. The terminal-PC displays an image on the display according to the received display data. In this way, since only data of relative small size is transmitted between the terminal-PC and the designated shared-PC, even in a case where the terminal-PC and the designated shared-PC are connected by a narrow-band line such as the Internet, communication speed sufficiently fast for operation can be reached.

In the above manner, the terminal-PC 410a and the designated shared-PC 320a are connected, so that the terminal-PC can access the designated disk LUa via the designated shared-PC. For example, in the case of executing an application program stored on the designated disk, the designated user recognizes the image, which is provided by the designated shared-PC and displayed on the display of the terminal-PC, and instructs execution of the application program using an input device. The designated shared-PC, on the basis of the input data, then downloads the application program from the designated disk and runs it, sending the image provided by the application program to the terminal-PC.

B-2. Process Description of Steps S210, S230, S250:

In Step S210 (FIG. 13), Step S230 (FIG. 14), and Step S250 (FIG. 14), the management server 110 utilized the user disk management table TB3.

FIGS. 16(A)-16(D) are illustrations showing user disk management data DA relating to the designated user, included in the user disk management table TB3. FIGS. 16(A)-16(D) show respectively the user disk management data DA prior to the process of Step S210, after the process of Step S210, after the process of Step S230, and after the process of Step S250. FIG. 16(A) is the same as FIG. 11. The following description of the processes of Steps S210, S230 and S250 makes reference to FIGS. 16(A)-16(D).

Figure 17:
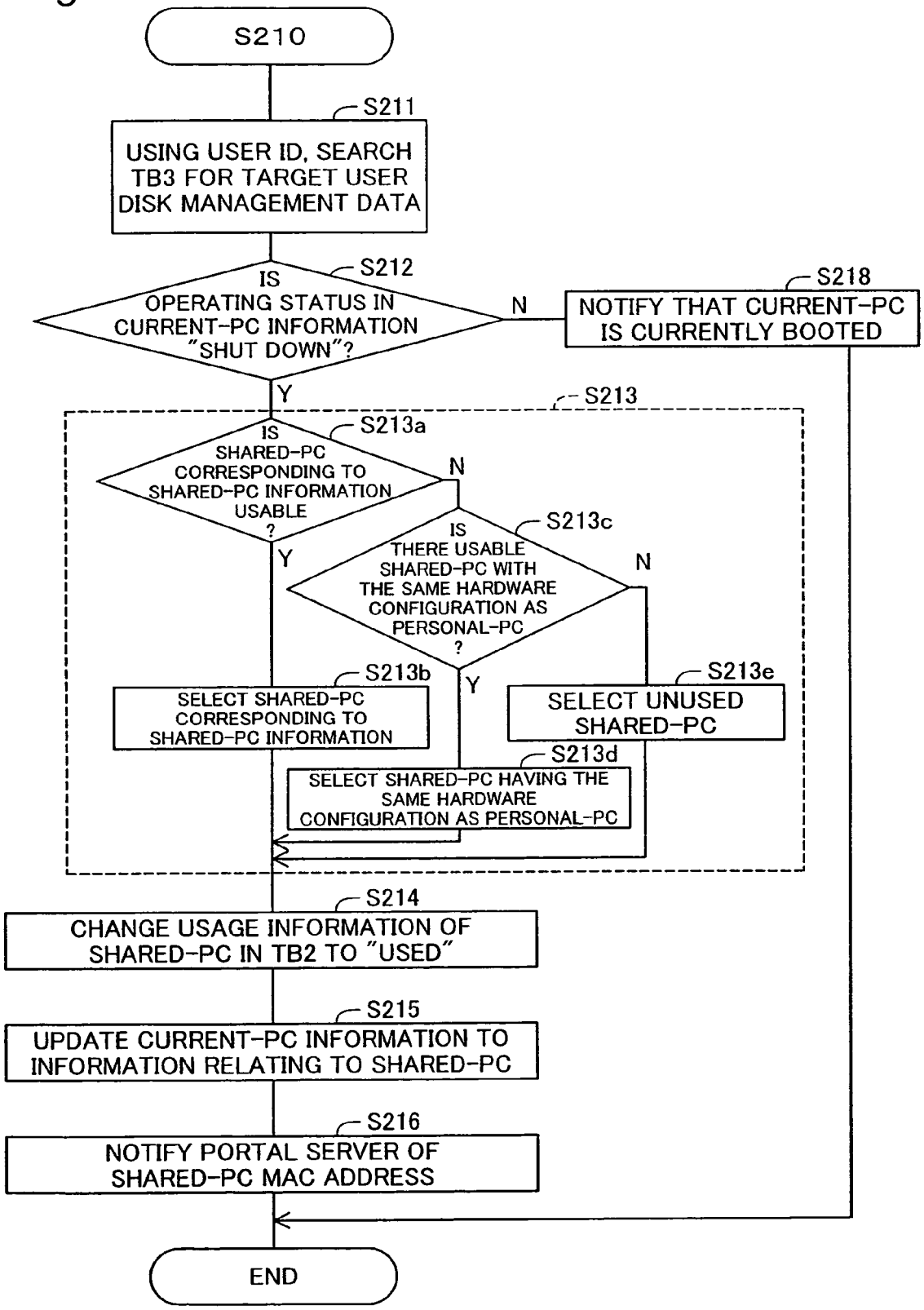
FIG. 17 is a flowchart showing the particular process description of Step S210 (FIG. 13)

B-2-1. Process of Step S210:

FIG. 17 is a flowchart showing the particular process description of Step S210 (FIG. 13). As described above, in Step S210, the management server 110 (shared-PC selection module 114a) selects the shared-PC to be booted up.

In Step S211, using the provided user ID, the target user disk management data is searched for in the user disk management table TB3. Specifically, the user disk management data DA including the same user ID as the user ID sent from the portal server 350 in Step S208 (FIG. 13) is searched for. As shown in FIG. 16(A), the user ID "USRA" has been set in the user identifying information of the user disk management data DA.

In Step S212, it is determined whether the operating status included in the current-PC information in the user disk management data DA has been set to "shut down". If the operating status has been set to "shut down", in other words, if the designated user using the terminal-PC 410a is not currently using the personal-PC and the shared-PC, the routine proceeds to Step S213.

In Step S213, one of the plurality of shared-PCs is selected as the designated shared-PC to be booted up. Selection of the designated shared-PC is carried out by the following procedure.

In Step S213a, the management server 110 determines whether the shared-PC corresponding to the shared-PC information in the user disk management data DA is useable. If any shared-PC has been allocated to the designated user in the past, shared-PC information relating to the shared-PC in question will have been set in the user disk management data. Accordingly, if shared-PC information has been set in the user disk management data, a determination is made as to whether the shared-PC designated by the PC identifying information (MAC address) included in the shared-PC information is useable. The determination as to usability is carried out utilizing the usage information in the PC resource management table TB2 (FIG. 10).

If the shared-PC corresponding to the shared-PC information is determined to be usable, in Step S213b, the shared-PC in question is selected as the designated shared-PC. On the other hand, if the shared-PC corresponding to the shared-PC information is determined to be not usable, more specifically, if a determination that shared-PC information has not been set in the user disk management data, and/or the shared-PC corresponding to shared-PC information which has been set is not usable, the routine proceeds to Step S213c.

In this way, if shared-PC information indicating a shared-PC allocated in the past is registered in the user disk management data, one shared-PC can easily be selected from among the plurality of shared-PCs.

In this embodiment, in the current stage, shared-PC information has not yet been set in the user disk management data DA, so the routine proceeds to Step S213c.

In Step S213c, the management server 110 determines whether there is a usable shared-PC having the same hardware configuration as the personal-PC used by the designated user. The same hardware configuration refers to the same processor clock frequency and bus transmission speed. If the hardware configuration of the personal-PC and the hardware configuration of the shared-PC are the same, and the PC group information (model, etc.) of the personal-PC and the PC group information (model, etc.) of the shared-PC set in the PC resource management table TB2 (FIG. 10) will also be the same. The management server first selects, from the PC resource management table TB2, the first PC resource management data that includes the same MAC address as the MAC address of the personal-PC included in the user disk management data. Next, the management server selects, from the PC resource management table TB2, the second PC resource management data that includes the same PC group information as the PC group information contained in the first PC resource management data. The second PC resource management data is selected from the group of data whose PC type information indicates "shared" and whose usage information indicates "unused".

If a usable shared-PC having the same hardware configuration as the personal-PC is present, the shared-PC in question is selected as the designated shared-PC in Step S213d. On the other hand, if the shared-PC in question is not present, the routine proceeds to Step S213e.

In this way, by utilizing the PC resource management table TB2 (FIG. 10), one shared-PC capable of executing the OS and other program stored in the designated disk can be readily selected from among the plurality of shared-PCs.

Note that, in this embodiment, from the first PC resource management data that includes the same MAC address as the MAC address "aaa" of the designated shared-PC contained in the user disk management data DA, it can be ascertained that the model of the designated shared-PC is "Type A". Then, a shared-PC having the same model "Type A" as the personal-PC model is selected as the designated shared-PC.

In Step S213e, the management server 110 selects as the designated shared-PC a shared-PC not currently in use. However, in this case, the disk image copied to the designated disk is not suitable to the hardware configuration of the shared-PC in question. Thus, in Step S213e, a shared-PC having a virtual machine function installed is selected as the designated shared-PC. As will be apparent from this description, whether a virtual machine function is installed or not is registered in the PC group information.

In Step S213e, an unused shared-PC having a virtual machine function installed is selected, but instead an arbitrary unused shared-PC may be selected. In this case, the management server will add to the user disk image a driver and registry information needed to run the arbitrary shared-PC, and select the shared-PC in question as the designated shared-PC. Specifically, the management server possesses in advance the driver and registry information suitable for the arbitrary shared-PC. The management server functions as the iSCSI initiator, accesses the designated disk, and copies to the designated disk the driver and registry information suitable for the arbitrary shared-PC. By means of this, since any shared-PC can operate utilizing the designated disk, any shared-PC can be selected as the designated shared-PC. The driver and registry information suitable for the arbitrary shared-PC can be selected on the basis of the PC group information.

In Step S214, the usage information of the designated shared-PC in the PC resource management table TB2 (FIG. 10) is changed to "used". As a result, the designated shared-PC assumes a state where it cannot be used by the other users.

In Step S215, information relating to the designated shared-PC is set in the current-PC information included in the user disk management data. In this embodiment, as noted, since a shared-PC having the model "Type A" shown in FIG. 10 has been selected as the designated shared-PC, the PC type contained in the current-PC information is set to "shared", and the MAC address is set to "bbb" as shown in FIG. 16(B).

In Step S216, as described in FIG. 13, the portal server 350 is notified of the MAC address of the designated shared-PC.

In Step S212, if operating status has been set to "booted", in other words, if the designated disk is being used by a personal-PC or a shared-PC, the routine proceeds to Step S218. In Step S218, the management server 110, via the portal server 350, notifies the terminal-PC 410a that the current-PC (personal-PC or shared-PC) is currently booted, in other words, that the designated disk is in use. In this case, the designated user using the terminal-PC may, for example, instruct termination of the current-PC, or suspend access to the designated disk from the terminal-PC.

Figure 18:
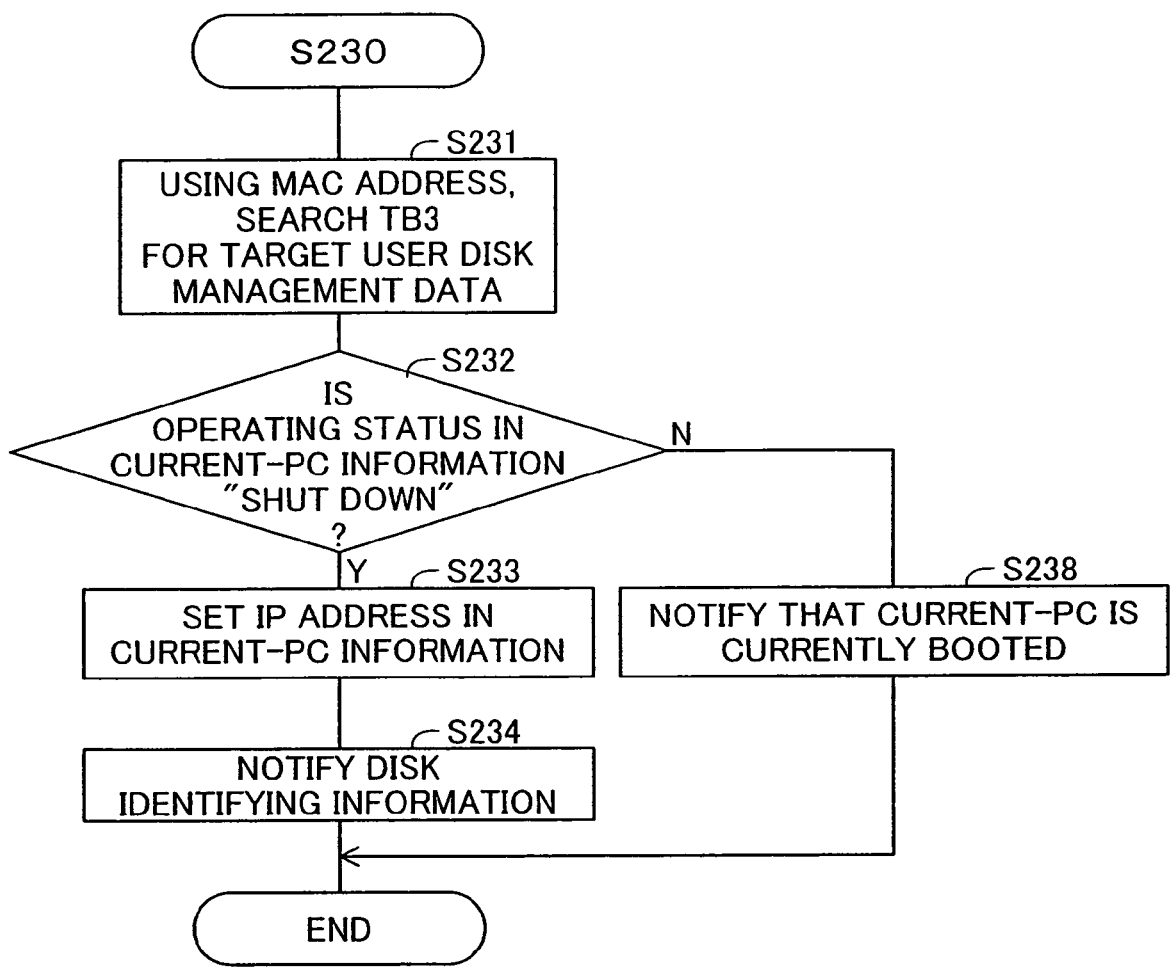
FIG. 18 is a flowchart showing the particular process description of Step S230 (FIG. 14)

B-2-2. Process of Step S230:

FIG. 18 is a flowchart showing the particular process description of Step S230 (FIG. 14). As described above, in Step S230, the management server 110 (disk selection module 114b) selects the disk to be accessed by the designated shared-PC.

In Step S231, using the provided MAC address, the target user disk management data is searched for in the user disk management table TB3. Specifically, the user disk management data DA having current-PC information that includes the same MAC address as the MAC address sent from the designated shared-PC in Step S228 (FIG. 14) is searched for. As shown in FIG. 16(B), after the process of Step S210, the MAC address "bbb" of the designated shared-PC has been set in the current-PC information of the user disk management data DA.

In Step S232, it is determined whether the operating status included in the current-PC information in the user disk management data DA has been set to "shut down". If the operating status has been set to "shut down", in other words, if the designated disk is not being utilized by the personal-PC and the shared-PC, the routine proceeds to Step S233.

In Step S233, the IP address sent from the designated shared-PC in Step S228 (FIG. 14) is set in the current-PC information of the user disk management data DA. Specifically, as shown in FIG. 16(C), the IP address included in the current-PC information is set to "b.b.b.b".

In Step S234, the designated shared-PC is notified of the disk identifying information in the user disk management data DA.

In Step S232, if the operating status has been set to "booted", in other words, if the designated disk is being utilized by the personal-PC or the shared-PC, the routine proceeds to Step S238. In Step S238, as in Step S218, the management server 110 notifies the terminal-PC 410a, via the portal server 350, that the current-PC (personal-PC or shared-PC) is currently booted.

Figure 19:
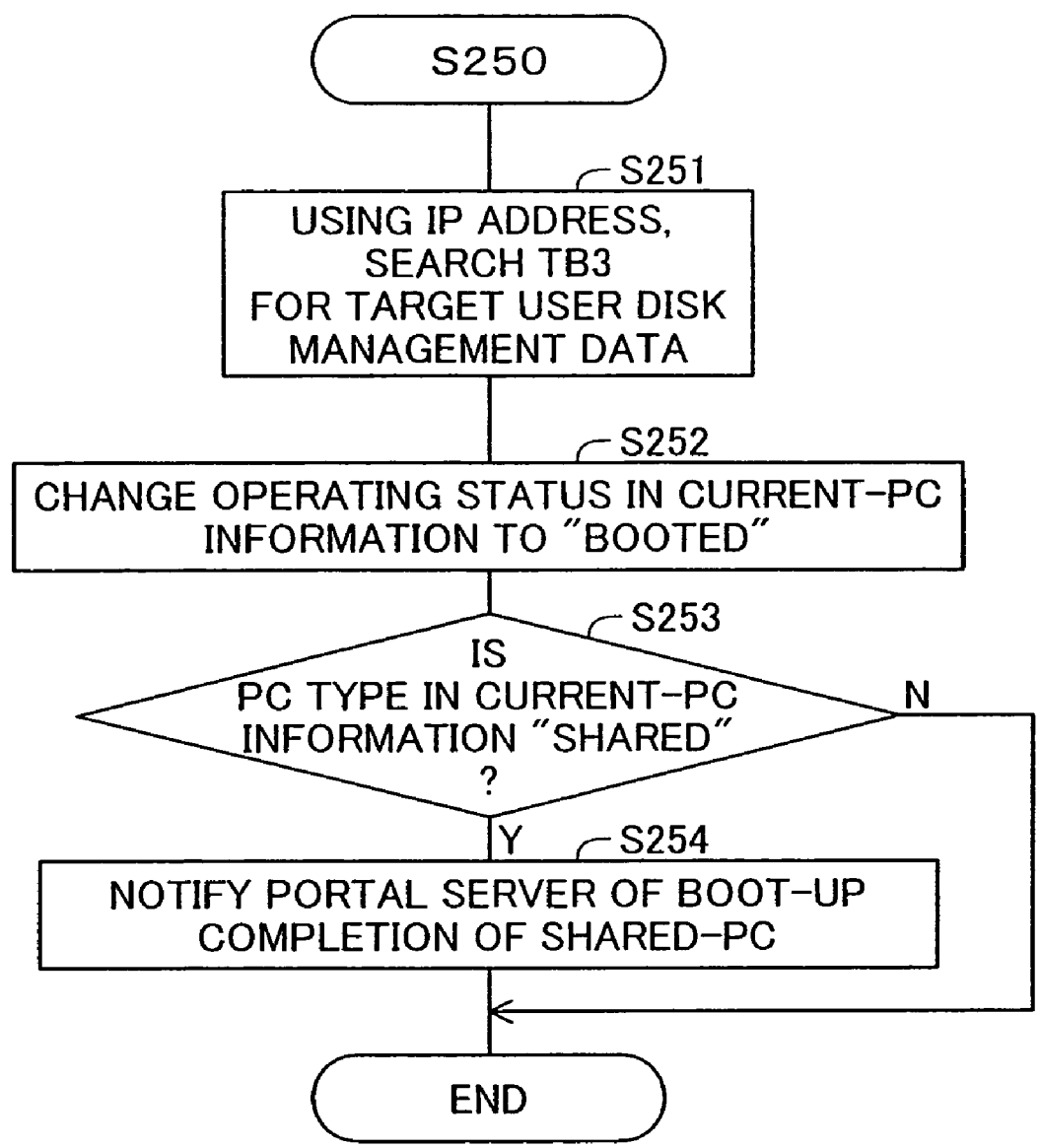
FIG. 19 is a flowchart showing the particular process description of Step S250 (FIG. 14)

B-2-3. Process of Step S250:

FIG. 19 is a flowchart showing the particular process description of Step S250 (FIG. 14). As described above, in Step S250, the management server 110 executes the boot-up finishing process for the designated shared-PC.

In Step S251, using the provided IP address, the target user disk management data is searched for in the user disk management table TB3. Specifically, the user disk management data DA having current-PC information that includes the same IP address as the IP address sent from the designated shared-PC in Step S244 (FIG. 14) is searched for. As shown in FIG. 16(C), after the process of Step S230, the IP address "b.b.b.b" of the designated shared-PC has been set in the current-PC information of the user disk management data DA.

In Step S252, as shown in FIG. 16(D), the operating status contained in the current-PC information of the user disk management data DA is changed to "booted".

In Step S253, it is determined whether the PC type included in the current-PC information of the user disk management data DA has been set to "shared". If the PC type has been set to "shared", the routine proceeds to Step S254.

In Step S254, the portal server 350 is notified that the boot-up of the designated shared-PC is completed.

In Step S253, if the PC type has been set to "personal", Step S254 is skipped, and the process of Step S250 terminates (described later).

Figure 20:
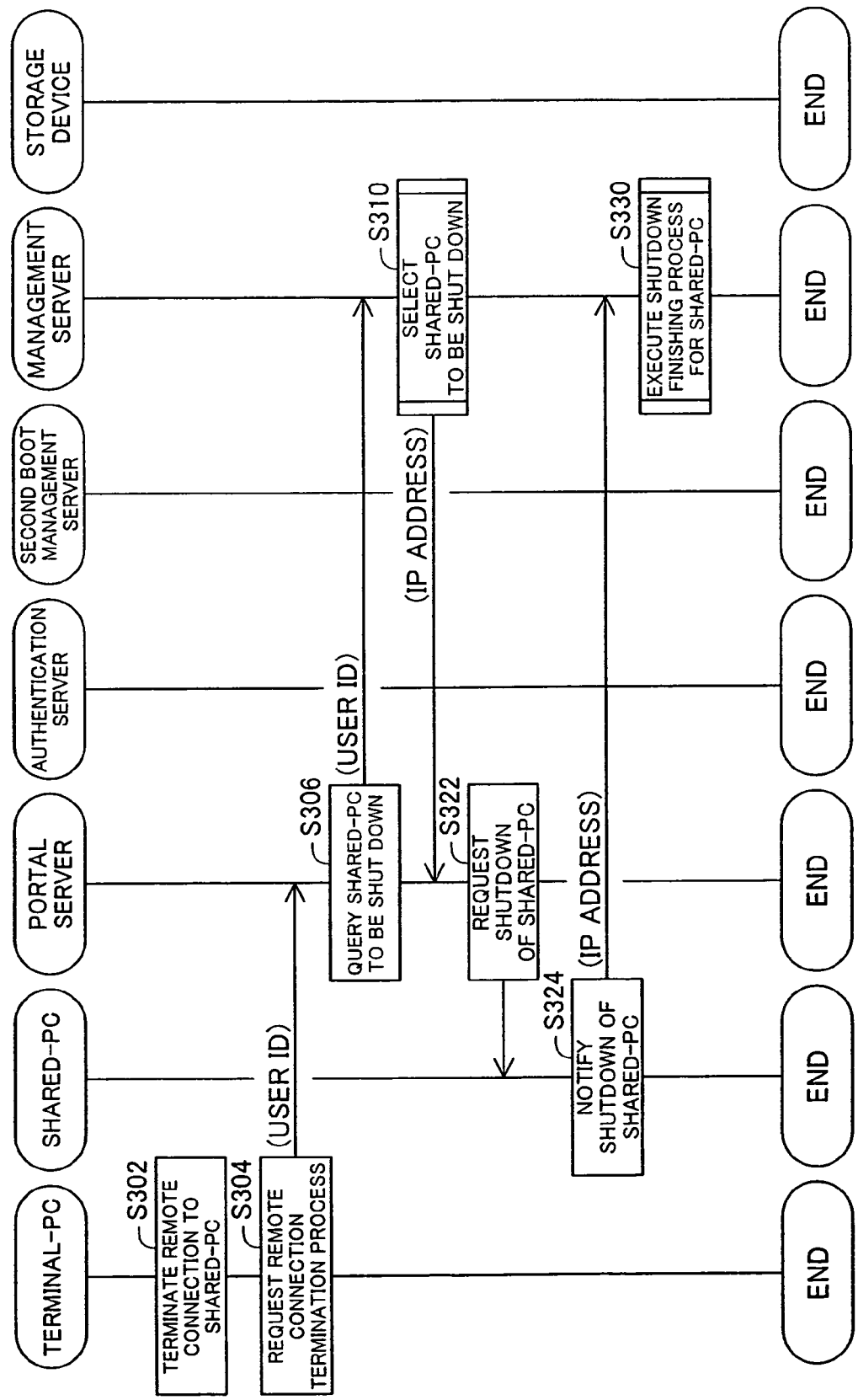
FIG. 20 is a flowchart showing the procedure of the shutdown process of a shared-PC.

B-3. Shared-PC Shutdown Process:

FIG. 20 is a flowchart showing the procedure of the shutdown process of a shared-PC.

In Step S302, the terminal-PC 401a terminates the remote connection to the designated shared-PC. Specifically, the user closes the remote-desktop client program in the terminal-PC 410a.

In Step S304, the terminal-PC 410a requests the portal server 350 for a remote connection termination process. At this time, the browser sends the user ID to the portal server.

In Step S306, the portal server 350 queries the management server 110 regarding the shared-PC to be shut down. At this time, the user ID is sent.

In Step S310, the management server 110 uses the provided user ID so as to select the shared-PC to be shut down. Selection of the shared-PC is carried out utilizing management information 115 (FIG. 2). The management server then sends the IP address of the selected shared-PC to the portal server 350. The process of Step S310 will be further described later.

In Step S322, the portal server 350 makes a shutdown request to the designated shared-PC 320a specified by the provided IP address.

In Step S324, the designated shared-PC begins to shut down, and notifies the management server 110 of shutdown of the shared-PC. Specifically, the designated shared PC (management client program) requests the management server (management program) to execute a shutdown finishing process for the shared-PC. At this time, the IP address is sent. Then, in Step S324, the power of the designated shared-PC is turned off.

In Step S330, the management server 110 executes the shutdown finishing process for the shared-PC. The shutdown finishing process is carried out utilizing management information 115 (FIG. 2). The process of Step S330 will be further described later.

B-4. Process Description of Steps S310, S330:

In Steps S310 and S330 (FIG. 20), the management server 110 utilizes the user disk management table TB3.

FIGS. 21(A) and 21(B) are illustrations showing user disk management data DA relating to the designated user included the user disk management table TB3. FIGS. 21(A) and 21(B) respectively show the user disk management data DA prior to the process of Step S310, and after the process of Step S330. FIG. 21(A) is the same as FIG. 16(D). The following description of the processes of Steps S310 and S330 makes reference to FIGS. 21(A) and 21(B).

B-4-1. Process of Step S310:

FIG. 22 is a flowchart showing the particular process description of Step S310 (FIG. 20). As described above, in Step S310, the management server 110 selects the shared-PC to be shut down.

In Step S311, using the provided user ID, the target user disk management data is searched for in the user disk management table TB3. Specifically, the user disk management data DA that includes the same user ID as the user ID sent from the portal server 350 in Step S306 (FIG. 20) is searched for. As shown in FIG. 21(A), the user ID "USRA" has been set in the user identifying information of the user disk management data DA.

In Step S312, the portal server 350 is notified of the IP address included in the current-PC information of the user disk management data DA.

Figure 23:
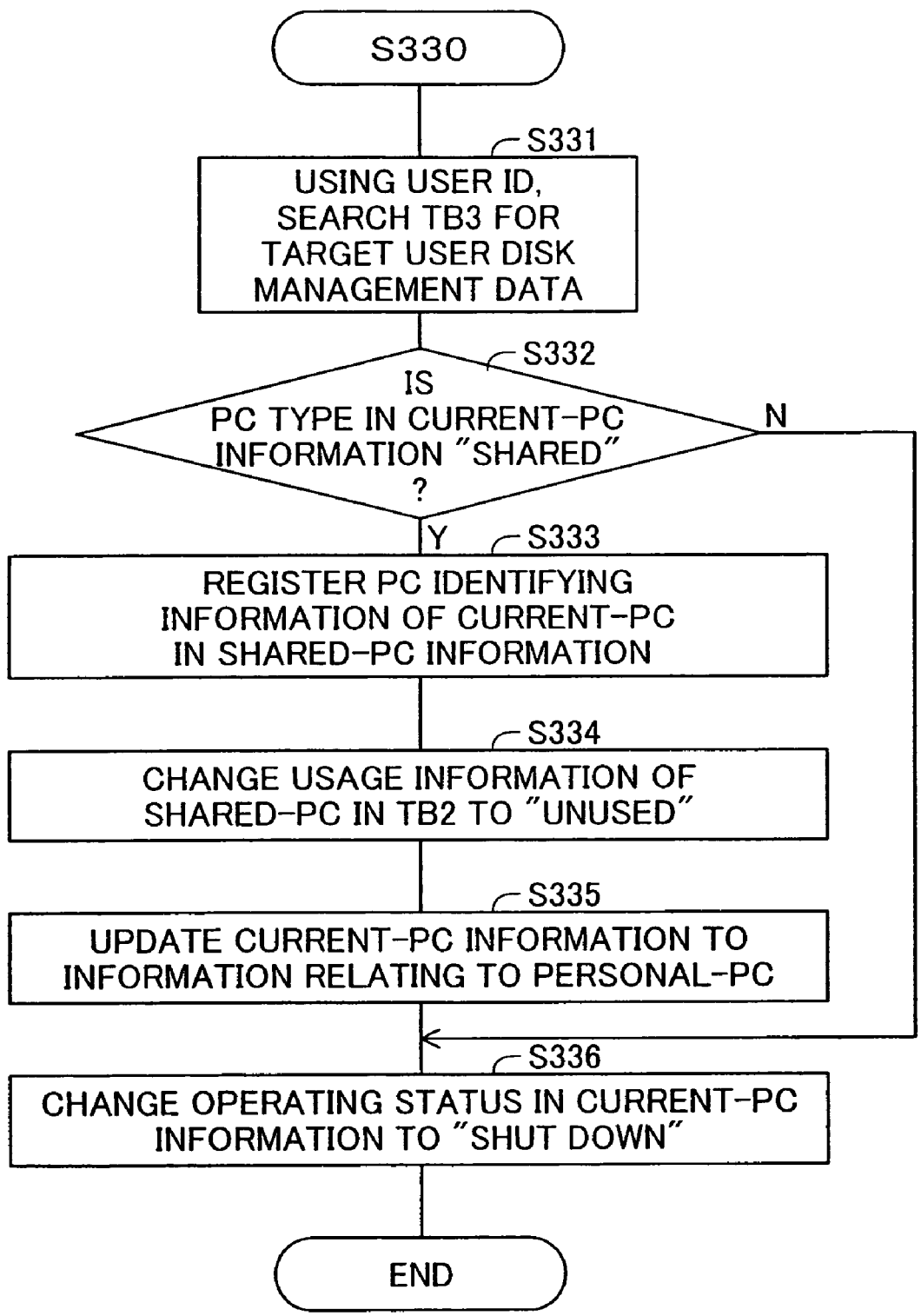
FIG. 23 is a flowchart showing the particular process description of Step S330 (FIG. 20)

B-4-2. Process of Step S330:

FIG. 23 is a flowchart showing the particular process description of Step S330 (FIG. 20). As described above, in Step S330, the management server 110 executes the shutdown finishing process for the shared-PC.

In Step S331, using the provided user ID, the target user disk management data is searched for in the user disk management table TB3. Specifically, the user disk management data DA that has current-PC information including the same IP address as the IP address sent from the designated shared-PC in Step S324 (FIG. 20) is searched for. As shown in FIG. 21(A), prior to the process of Step S330, the IP address "b.b.b.b" of the designated shared-PC has been set in the current-PC information of the user disk management data DA.

In Step S332, it is determined whether the PC type included in the current-PC information of the user disk management data DA has been set to "shared". If the PC type has been set to "shared", in other words, if the designated user using the terminal-PC 410a was using the shared-PC, the routine proceeds to Step S333.

In Step S333, as shown in FIG. 21(B), the PC identifying information (MAC address "bbb") contained in the current-PC information is set in the shared-PC information of the user disk management data DA. Also, in Step S333, referring to the PC resource management table TB2 (FIG. 10), the PC group "Type A" is set in the shared-PC information of the user disk management data DA. As a result, information relating to the shared-PC allocated in the past is set in the shared-PC information.

In Step S334, the usage information of the designated shared-PC in the PC resource management table TB2 (FIG. 10) is changed to "unused". As a result, the designated shared-PC assumes a state where it can be used by another user.

In Step S335, the current-PC information in the user disk management data DA is modified to information relating to the personal-PC. Specifically, as shown in FIG. 21(B), the PC type included in the current-PC information is changed to "personal", and the MAC address is changed to "aaa".

In Step S336, as shown in FIG. 21(B), the operating status included in the current-PC information of the user disk management data DA is changed to "shut down". In Step S336, the IP address included in the current-PC information is deleted.

In Step S332, if the PC type has been set to "personal", Steps S333 through S335 are skipped, and the process of Step S336 is executed (described later).

C. Utilization of Designated Disk by Personal-PC:

As noted hereinabove, a user may perform ongoing operations in the same operating environment, in both cases where a personal-PC accesses a disk and where a terminal-PC accesses the disk via a shared-PC. To realize this, in this embodiment, after the disk image of the personal-PC has been copied to the designated disk by means of the process of FIG. 12, the personal-PC uses the disk image in the designated disk so as to boot up. Following is a description of the personal-PC boot process and shutdown process.

Figure 24:
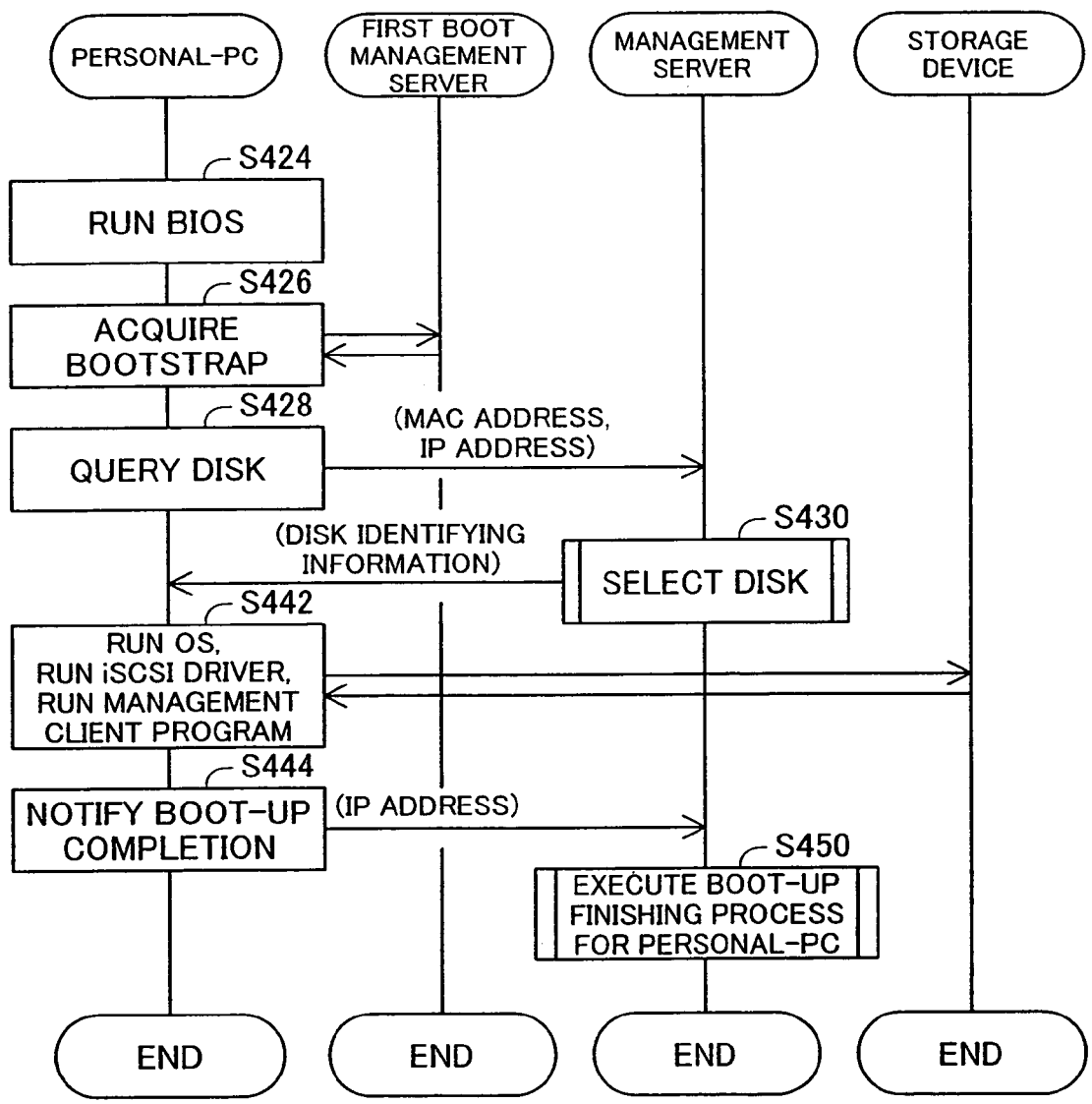
FIG. 24 is a flowchart showing the procedure of the personal-PC boot process.

C-1. Personal-PC Boot Process:

FIG. 24 is a flowchart showing the procedure of the personal-PC boot process. FIG. 24 is analogous to FIG. 14. However, the shared-PC is changed to a personal-PC, and the second boot management server is changed to the first boot management server.

Specifically, in Steps S424-S428, a process similar to that of Steps S224-S228 (FIG. 14) is executed, and the designated personal-PC 220a queries the management server 110 regarding the designated disk to be accessed.

In Step S430, a process similar to that of Step S230 (FIG. 14, FIG. 18) is executed, and the management server 110 sends disk identifying information indicating the designated disk to the designated personal-PC 220a.

In Steps S442-S444, a process similar to that of Steps S242-S244 (FIG. 14) is executed, and the designated personal-PC 220a accesses the designated disk, boots up, and notifies the management server 100 of boot-up completion.

In Step S450, a process similar to that of Step S250 (FIG. 14, FIG. 19) is executed, and the management server 110 executes a boot-up finishing process for designated personal-PC 220a. However, unlike Step S250, the management server does not notify boot-up completion of the designated personal-PC.

C-2. Process Description of Steps S430, S450:

In Steps S430 and S450, the management server 110 utilizes the user disk management table TB3 in the same way as in Step S230 (FIG. 14) and Step S250 (FIG. 18). Specifically, in Step S430, the management server 110 updates the user disk management table TB3 in accordance with the flowchart shown in FIG. 14. In Step S450, the management server 110 updates the user disk management table TB3 in accordance with the flowchart shown in FIG. 18.

FIGS. 25(A)-25(C) are illustrations showing user disk management data DA relating to the designated user included in the user disk management table TB3. FIGS. 25(A)-25(C) respectively show the user disk management data DA prior to the process of Step S430, after the process of Step S430, and after the process of Step S450. FIG. 25(A) is the same as FIG. 21(B). The following description of Steps S430 and S450 makes reference to is FIGS. 25(A)-25(C).

C-2-2. Process of Step S430:

In Step S430, as illustrated in FIG. 14, the management server 110 first searches for the user disk management data DA that has current-PC information including the same MAC address as the MAC address sent from the designated personal-PC in Step S428 (FIG. 24) (refer to Step S231). As shown in FIG. 25(A), prior to the process of Step S430, the personal-PC MAC address "aaa" has been set in the current-PC information of the user disk management data DA.

Next, the management server 110 determines whether the operating status included in the current-PC information of the user disk management data DA has been set to "shut down" (refer to Step S232). In FIG. 25(A), the operating status has been set to "shut down".

Next, as shown in FIG. 25(B), the management server 110 sets the IP address "a.a.a.a" sent from the designated personal-PC in Step S428 (FIG. 24), in the current-PC information of the user disk management data DA (refer to Step S233).

Finally, the management server 110 notifies the designated personal-PC of the disk identifying information in the user disk management data DA (refer to Step S234).

C-2-3. Process of Step S450:

In Step S450, as described in FIG. 18, the management server 110 first searches for user disk management data DA having current-PC information that includes the same IP address as the IP address sent from the designated personal-PC in Step S444 (FIG. 24) (refer to Step S251). As shown in FIG. 25(B), after the process of Step S430, the IP address "a.a.a.a" of the designated personal-PC has been set in the current-PC information of the user disk management data DA.

Next, as shown in FIG. 25(C), the management server 110 changes the operating status included in the current-PC information of the user disk management data DA to "booted" (refer to Step S252).

At this time, as shown in FIG. 25(C), since the PC type included in the current-PC information of the user disk management data DA has been set to "personal", the management server 110 terminates the process of Step S450, without executing notification of boot-up completion of the designated personal-PC (refer to Step S253).

Figure 26:
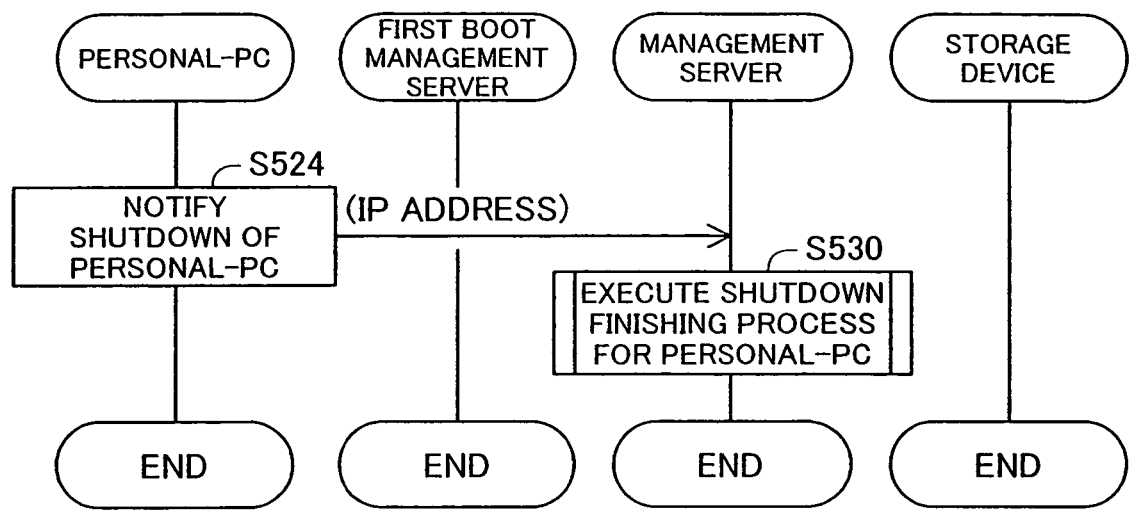
FIG. 26 is a flowchart showing the procedure of the shutdown process of a personal-PC.

C-3. Personal-PC Shutdown Process:

FIG. 26 is a flowchart showing the procedure of the shutdown process of a personal-PC. FIG. 26 is substantially the same as FIG. 20. The shared-PC is changed to a personal-PC, and the second boot management server is changed to the first boot management server.

Specifically, in Step S524, a process similar to Step S324 (FIG. 20) is executed, and the designated personal-PC 220a begins to shut down, and notifies the management server 110 that the designated personal-PC is shut down.

In Step S530, a process similar to Step S330 (FIG. 20, FIG. 23) is executed, and the management server 110 executes a shutdown finishing process for the designated personal-PC.

C-4. Process Description of Step S530:

In Step S530, the management server 110 utilizes the user disk management table TB3 in the same way as in Step S330 (FIG. 23). Namely, in Step S530, the management server 110 updates the user disk management table TB3, in accordance with the flowchart shown in FIG. 23.

FIGS. 27(A) and 27(B) are illustrations showing user disk management data DA relating to the designated user included in the user disk management table TB3. FIGS. 27(A) and 27(B) respectively show the user disk management data prior to the process of Step S530 and after the process of Step S530. FIG. 27(A) is the same as FIG. 25(C). The following description of the process of Step S530 refers to FIGS. 27(A) and 27(B).

In Step S530, the management server searches for user disk management data DA having current-PC information that includes the same IP address as the IP address sent from the designated personal-PC in Step S524 (FIG. 26) (refer to Step S331). As shown in FIG. 27(A), prior to the process of Step S530, the IP address of "a.a.a.a" of the designated personal-PC has been set in the current-PC information of the user disk management data DA.

At this time, as shown in FIG. 27(A), the PC type included in the current-PC information of the user disk management data DA has been set to "personal" (refer to Step 332). Thus, as shown in FIG. 27(B), the management server 110 changes the operating status included in the current-PC information of the user disk management data DA to "shut down", and deletes the IP address included in the current-PC information (refer to Step S336).

As described hereinabove, in the network system of this embodiment, both the designated personal-PC 220a and the designated shared-PC 320a can connect to the same designated disk LUa and execute the same boot-up program including the OS or the like, and thus the designated user can work in the same operating environment, both in the case of the designated user using the designated personal-PC 220a within the network system, and in the case of using the terminal-PC 410a outside of the network system.

In this embodiment there is the additional advantage that since shared-PCs are shared by a plurality of users, shared-PCs may be prepared in numbers smaller than the number of users.

Additionally, in this embodiment, the current-PC information in the user disk management table TB3 is updated each time that there is a change in connection status between the designated disk LUa and the designated personal-PC 220a or designated shared-PC 320a. A resultant advantage is that the network system manager, by referring to the user disk management table TB3, can readily ascertain which PC is connected to the designated disk.

Further, in this embodiment, if the storage device 120 is utilized by the terminal-PC 410a, the terminal-PC connects to the designated shared-PC 320 connected to the third sub-net NWA3, and does not connect to the second sub-net NWA2 to which the personal-PCs are connected. A resultant advantage is that security of the network system can be improved.

The invention is not limited to the above examples and embodiments set forth hereinabove, and can be reduced to practice in various ways without departing from the spirit thereof, such as the following variations, for example.

(1) In the above embodiment, as described in FIG. 13, when a terminal-PC utilizes a disk via the Internet, the terminal-PC accesses the management server indirectly via the portal server. On the other hand, as described in FIG. 24, when a personal-PC accesses a disk via an intranet, the personal-PC accesses the management server directly, not through the portal server. Thus, in the above embodiment, the management server, depending on whether or not there is access from the portal server, determines whether a disk is utilized from outside the network system, or a disk is utilized from inside the network system. If a disk is utilized from outside the network system, the management server then boots up a shared-PC.

However, there could be supposed another aspect wherein when another terminal connected to the intranet (termed in internal terminal-PC) utilizes a disk via the intranet, the internal terminal-PC accesses the management server indirectly via the portal server. In such an aspect, the management server may determine whether or not a disk is utilized from outside the network system, on the basis of the IP address of the external terminal-PC or internal terminal-PC. Specifically, in Step S202 of FIG. 13, the external terminal-PC or internal terminal-PC may transmit its IP address to the portal server, and in Step S208, the portal server may send the IP address to the management server. Then, in Step S210, the management server may determine, on the basis of the received IP address, whether or not the disk is being utilized from outside the network system. If the management server determines that utilization of the disk is from the outside, it may boot up a shared-PC. On the other hand, if the management server determines that utilization of the disk is from the inside, it may boot up a personal-PC.

In this aspect, when booting up a personal-PC, a process similar to that of booting up a shared-PC is executed. Specifically, in FIGS. 13-15, the process is executed while replacing the external terminal-PC with an internal terminal-PC, and replacing the shared-PC with a personal-PC. In this embodiment, when shutting down a personal-PC, a process similar to that of shutting down a shared-PC is executed. Specifically, in FIG. 20, the process is executed while replacing the external terminal-PC with an internal terminal-PC, and replacing the shared-PC with a personal-PC.

(2) In the above embodiment, as described in FIG. 12, the manager creates user disk management data by using a personal-PC, but instead the manager may use a management console (not shown), without using a personal-PC, to create the user disk management data. In this aspect, it is not necessary to provide a disk creation program to the personal-PC.

Specifically, utilizing the management console, the manager registers in the partition table 125 of the storage device 120 (FIG. 3) the iSCSI initiator name of the designated personal-PC for specifying a disk. The manager also installs, in the designated disk specified by the iSCSI initiator, an OS, iSCSI driver, management client program, and a remote-desktop server program, and creates a disk image. The manager then utilizes the management console so as to create the user disk management data in the user disk management table TB3 of the management server 110. The created user disk management data may include the same information as the information registered in the process of FIG. 12.

In this aspect, as described above, the personal-PC need not be provided with a disk creation program, and thus the storage unit of the personal-PC may be omitted. That is, in this aspect, since it is possible to omit the storage units from both the personal-PCs and the shared-PCs, the personal-PC software configuration and the shared-PC software configuration may be the same.

Also, in this aspect, since the personal-PC is a diskless PC without a storage unit, the personal-PC can be booted up utilizing a disk image present in the disk from the outset. The disk image can be created, for example, by the manager replicating data from a computer used previously by the user.

(3) In the above embodiment, two boot management servers 210, 310 is used, but instead it is possible to use a single boot management server. Specifically, where the boot management server has a DHCP relay agent function, since it is possible to manage a plurality of sub-nets, a single boot management server may be used.

(4) In the above embodiment, a single storage device is connected to the network system, but instead a plurality of storage devices may be connected. In this case, the disk resource management table TB1 may contain disk resource management data including mutually different iSCSI target names and IP addresses.

(5) In the above embodiment, the same iSCSI target name and IP address are set for the plurality of logical units included in a single storage device, but instead the same IP address and mutually different iSCSI target names may be set. In this case, since logical units can be specified by iSCSI target names, iSCSI initiator names may be omitted.

(6) In the above embodiment, in the user disk management data of the user disk management table TB3, only information relating to one shared-PC allocated in the past is set as shared-PC information, but instead information relating to a plurality of shared-PCs allocated in the past may be set. In this case, of the plurality shared-PCs, shared-PCs having the same hardware configuration as the designated personal-PC may be preferentially selected as the designated shared-PC.

Although the present invention has been described and illustrated in detail, it is clearly understood that the same is by way of illustration and is example only and is not to be taken by way of limitation, the spirit and scope of the present invention being limited only by the terms of the appended claims.

What is claimed is:

1. A network system permitting access from an external terminal, the network system comprising:
    a first computer used by a designated user;
    a plurality of second computers capable of being shared by a plurality of users;
    a storage device connectable with the first computer and the plurality of second computers, the storage device containing a plurality of storage areas wherein one of the plurality of storage areas is a designated storage area allotted for use by the designated user, the designated storage area having stored therein a boot-up program for booting up the first computer or the second computer used by the designated user, to a state in which the designated user can utilize the first computer or the second computer; and a management device that manages connections between the first computer and the plurality of second computers, and connections between the first and second computers and the storage device, and comprises a computer selecting section for selecting a designated computer from among the plurality of second computers, a portal server coupled with the external terminal, and an authentication server for authenticating the designated user of the first computer and the plurality of users of the second computers, wherein if the storage device is utilized by the first computer, the management device allows the first computer to connect to the designated storage area and execute the boot-up program; and wherein if the storage device is utilized by the external terminal used by the designated user, the management device allows one designated computer selected from the plurality of second computers to connect to the designated storage area and execute the boot-up program, and allows the external terminal to connect to the designated computer;

wherein the computer selecting section comprises:

a first table having stored therein information indicating a second computer of a first class previously allocated to the designated user, a second table having stored therein information relating to a hardware configuration of the first computer and information relating to a hardware configuration of the plurality of second computers, a storage area selecting section for selecting the designated storage area from among the plurality of storage areas, and a third table containing information for identifying the first computer or the designated computer that connects to the designated storage area;

wherein the computer selecting section refers to the first table and selects as the designated computer the second computer of the first class, and refers to the second table and selects as the designated computer a second computer of a second class having the same hardware configuration as the first computer;

wherein the computer selecting section, if the second computer of the second class cannot be selected as the designated computer, selects as the designated computer a second computer of a third class having a virtual machine function, wherein the computer selecting section, if the second computer of the second class cannot be selected as the designated computer, selects as the designated computer an arbitrary second computer of a fourth class, and stores prepared information for operation of the second computer of the fourth class, in the designated storage area;

wherein the storage area selecting section selects the designated storage area on the basis of information provided by the first computer or the designated computer, and supplies information indicating the designated storage area to the first computer or the designated computer;

wherein the management device updates the identifying information in the third table, each time a connection status between the designated storage area and the first computer or the designated computer is changed;

wherein the designated computer receives from the external terminal input data input at the external terminal, and sends to the external terminal image data processed according to the input data; and wherein the portal server receives a request from the designated user for remote connection via the external terminal, requests the authentication server to authenticate the designated user, after the authentication, queries one of the plurality of second computers for the user to the management device, and requests boot up of the designated computer from the management device.

2. A network system according to claim 1, comprising:

a first subnet including the first computer; and a second subnet including the plurality of second computers, wherein the management device causes the external terminal to connect to the designated computer included in the second subnet, without connecting to the first subnet.

* * * * *

UNITED STATES PATENT AND TRADEMARK OFFICE
CERTIFICATE OF CORRECTION

PATENT NO. : 7,634,620 B2
APPLICATION NO. : 11/004193
DATED : December 15, 2009
INVENTOR(S) : Kobayashi et al.

It is certified that error appears in the above-identified patent and that said Letters Patent is hereby corrected as shown below:

Cover Page:

Should be added
--(30)   Foreign Application Priority Data,
   October 6, 2004   (JP)   ............2004-293215--

Signed and Sealed this
Twenty-fourth Day of July, 2012

David J. Kappos
*Director of the United States Patent and Trademark Office*